(12) United States Patent
Suzuki

(10) Patent No.: US 11,933,303 B2
(45) Date of Patent: Mar. 19, 2024

(54) SLIDING COMPONENT

(71) Applicant: EAGLE INDUSTRY CO., LTD., Tokyo (JP)

(72) Inventor: Hiroshi Suzuki, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/013,515

(22) PCT Filed: Jul. 1, 2021

(86) PCT No.: PCT/JP2021/024945
§ 371 (c)(1),
(2) Date: Dec. 28, 2022

(87) PCT Pub. No.: WO2022/009771
PCT Pub. Date: Jan. 13, 2022

(65) Prior Publication Data
US 2023/0258184 A1    Aug. 17, 2023

(30) Foreign Application Priority Data
Jul. 6, 2020 (JP) ................................. 2020-116360

(51) Int. Cl.
*F04C 29/00* (2006.01)
*F04C 18/02* (2006.01)

(52) U.S. Cl.
CPC .............. *F04C 29/00* (2013.01); *F04C 18/02* (2013.01); *F04C 2240/50* (2013.01)

(58) Field of Classification Search
CPC ....... F04C 29/00; F04C 18/02; F04C 2240/50
See application file for complete search history.

(56) References Cited

U.S. PATENT DOCUMENTS

| 3,380,040 A | 4/1968 | Liggett | F16C 17/045 |
| 3,383,116 A * | 5/1968 | Carter | F16J 15/3412 |
| | | | 277/408 |
| 3,527,465 A | 9/1970 | Guinard | |

(Continued)

FOREIGN PATENT DOCUMENTS

| CN | 1245552 | 2/2000 | ............... F16J 15/34 |
| CN | 2460801 | 11/2001 | ............... F16J 15/40 |

(Continued)

OTHER PUBLICATIONS

International Search Report and Written Opinion issued in PCT/JP2021/024940, dated Aug. 10, 2021, with English translation, 13 pages.

(Continued)

*Primary Examiner* — Shafiq Mian
(74) *Attorney, Agent, or Firm* — HAYES SOLOWAY P.C.

(57) ABSTRACT

Provided is a sliding component capable of stably reducing the frictional resistance between sliding surfaces entailing eccentric rotation. A sliding component has a sliding surface sliding relatively to a facing sliding surface with eccentric rotation. The sliding surface is provided with a plurality of dynamic pressure generation grooves arranged in a circumferential direction and each having, in a plan view, a tapered portion configured to become narrower toward a downstream side in an eccentric rotation direction of the facing sliding surface relatively to the sliding surface.

12 Claims, 13 Drawing Sheets

(56) References Cited

U.S. PATENT DOCUMENTS

| | | | | |
|---|---|---|---|---|
| 3,675,935 | A | 7/1972 | Ludwig | F16J 15/342 |
| 3,695,789 | A | 10/1972 | Jansson | F01C 21/003 |
| 3,704,019 | A | 11/1972 | McHugh | 277/400 |
| 3,782,737 | A | 1/1974 | Ludwig et al. | 277/27 |
| 4,056,478 | A | 11/1977 | Capelli | C01M 5/00 |
| 4,071,253 | A * | 1/1978 | Heinen | F16J 15/342 |
| | | | | 277/408 |
| 4,523,764 | A | 6/1985 | Albers et al. | 277/3 |
| 4,889,348 | A | 12/1989 | Amundson | 277/306 |
| 5,071,141 | A | 12/1991 | Lai et al. | |
| 5,092,612 | A * | 3/1992 | Victor | F16J 15/3412 |
| | | | | 277/400 |
| 5,174,584 | A * | 12/1992 | Lahrman | F01D 11/003 |
| | | | | 277/400 |
| 5,180,173 | A | 1/1993 | Kimura et al. | |
| 5,224,714 | A | 7/1993 | Kimura | 277/400 |
| 5,316,455 | A | 5/1994 | Yoshimura | F04C 29/0021 |
| 5,447,316 | A | 9/1995 | Matsui | 277/400 |
| 5,556,111 | A | 9/1996 | Sedy | 277/400 |
| 5,558,341 | A | 9/1996 | McNickle | 277/400 |
| 5,769,604 | A | 6/1998 | Gardner et al. | 415/170.1 |
| 5,834,094 | A | 11/1998 | Etsion et al. | 428/156 |
| 5,947,481 | A | 9/1999 | Young | 277/400 |
| 5,952,080 | A | 9/1999 | Etsion et al. | 428/156 |
| 6,002,100 | A | 12/1999 | Etsion | 219/121.71 |
| 6,046,430 | A | 4/2000 | Etsion | 219/121.71 |
| 6,135,458 | A | 10/2000 | Fuse | 277/401 |
| 6,152,452 | A | 11/2000 | Wang | 277/400 |
| 6,213,473 | B1 | 4/2001 | Lebeck | |
| 6,446,976 | B1 | 9/2002 | Key et al. | F16J 15/34 |
| 6,692,006 | B2 | 2/2004 | Holder | 277/346 |
| 6,726,213 | B2 | 4/2004 | Wang | 277/400 |
| 7,258,346 | B2 | 8/2007 | Tejima | 277/399 |
| 7,377,518 | B2 | 5/2008 | Lai | 277/400 |
| 7,758,051 | B2 | 7/2010 | Roberts-Haritonov | 277/401 |
| 7,931,277 | B2 | 4/2011 | Garrison | 277/399 |
| 8,100,405 | B2 | 1/2012 | Kneeland et al. | 277/355 |
| 8,342,534 | B2 | 1/2013 | Vasagar | 277/399 |
| 8,585,060 | B2 | 11/2013 | Oshii et al. | 277/401 |
| 9,151,390 | B2 | 10/2015 | Hosoe | F16J 15/3412 |
| 9,169,931 | B2 | 10/2015 | Tokunaga | F16J 15/34 |
| 9,228,660 | B2 | 1/2016 | Hosoe | F16J 15/3412 |
| 9,353,867 | B2 | 5/2016 | Itadani et al. | F16J 15/3448 |
| 9,494,239 | B2 | 11/2016 | Hosoe | F16J 15/342 |
| 9,512,923 | B2 | 12/2016 | Inoue et al. | F16J 15/34 |
| 9,574,666 | B2 | 2/2017 | Ferris | F16J 15/3412 |
| 9,574,667 | B2 | 2/2017 | Takabashi et al. | F16J 15/342 |
| 9,772,037 | B2 | 9/2017 | Itadani et al. | F16J 15/3412 |
| 9,784,372 | B2 | 10/2017 | Iguchi | F16J 15/342 |
| 9,863,473 | B2 | 1/2018 | Hosoe et al. | F16C 33/741 |
| 9,958,010 | B2 | 5/2018 | Itadani | F16C 33/74 |
| 9,982,715 | B2 | 5/2018 | Gorges et al. | F16C 33/201 |
| 10,054,230 | B2 | 8/2018 | Katori et al. | F16J 15/3412 |
| 10,132,411 | B2 | 11/2018 | Hosoe et al. | F16J 15/164 |
| 10,337,620 | B2 | 7/2019 | Tokunaga et al. | F16J 15/342 |
| 10,443,737 | B2 | 10/2019 | Itadani | F16J 15/342 |
| 10,495,228 | B2 | 12/2019 | Itadani | F16J 15/342 |
| 10,865,883 | B2 | 12/2020 | Seki et al. | F16J 15/3404 |
| 11,248,706 | B2 | 2/2022 | Imura | F16C 33/74 |
| 11,320,052 | B2 | 5/2022 | Imura et al. | F16J 15/34 |
| 2002/0014743 | A1 | 2/2002 | Zheng | 277/358 |
| 2002/0093141 | A1 | 7/2002 | Wang | F16J 15/34 |
| 2002/0158416 | A1 | 10/2002 | Hosanna | F16J 15/3404 |
| 2004/0080112 | A1 | 4/2004 | Tejima | F16J 15/3436 |
| 2005/0135957 | A1 | 6/2005 | Park | F04C 18/0215 |
| 2005/0212217 | A1 | 9/2005 | Tejima | 277/399 |
| 2005/0263963 | A1 | 12/2005 | Lai | 277/400 |
| 2007/0228664 | A1 | 10/2007 | Anand | F16J 15/3496 |
| 2007/0267820 | A1 | 11/2007 | Martin | F16J 15/3496 |
| 2007/0275267 | A1 | 11/2007 | Sabouni | F16J 15/3496 |
| 2007/0296156 | A1 | 12/2007 | Yanagisawa et al. | 277/352 |
| 2008/0050260 | A1 | 2/2008 | Iwanami et al. | 418/55.6 |
| 2008/0100001 | A1 | 5/2008 | Flaherty | |
| 2009/0200749 | A1 | 8/2009 | Teshima | F16J 15/3484 |
| 2011/0194966 | A1 * | 8/2011 | Takeuchi | F04C 18/0215 |
| | | | | 418/55.2 |
| 2011/0215531 | A1 | 9/2011 | Tokunaga et al. | 277/399 |
| 2011/0215535 | A1 | 9/2011 | Vasagar | 277/559 |
| 2011/0305871 | A1 | 12/2011 | Tabuchi | F16J 15/3284 |
| 2012/0018957 | A1 | 1/2012 | Watanabe | F16J 15/34 |
| 2012/0217705 | A1 | 8/2012 | Hosoe | 277/400 |
| 2013/0168928 | A1 | 7/2013 | Schrufer | C10M 103/02 |
| 2013/0209011 | A1 | 8/2013 | Tokunaga | |
| 2013/0323105 | A1 | 12/2013 | Chao et al. | F04C 29/028 |
| 2014/0159314 | A1 | 6/2014 | Hosoe | F16J 15/34 |
| 2014/0197600 | A1 | 7/2014 | Hosoe | F16J 15/342 |
| 2014/0217676 | A1 | 8/2014 | Hosoe et al. | 277/350 |
| 2014/0319776 | A1 | 10/2014 | Theike et al. | |
| 2015/0115540 | A1 | 4/2015 | Tokunaga | F16J 15/34 |
| 2015/0123350 | A1 | 5/2015 | Itadani | F16J 15/3412 |
| 2015/0167847 | A1 | 6/2015 | Tokunaga | |
| 2015/0184752 | A1 | 7/2015 | Itadani | F16J 15/3412 |
| 2015/0345642 | A1 | 12/2015 | Haas | F16J 15/3496 |
| 2015/0377297 | A1 | 12/2015 | Tokunaga et al. | F16C 33/748 |
| 2016/0033045 | A1 | 2/2016 | Itadani et al. | F16J 15/3412 |
| 2016/0097457 | A1 | 4/2016 | Sun et al. | F16J 15/3412 |
| 2017/0089467 | A1 | 3/2017 | Young | F01D 11/003 |
| 2017/0146014 | A1 | 5/2017 | Ohta et al. | F04C 29/0021 |
| 2017/0241549 | A1 | 8/2017 | Itadani | F16J 15/3412 |
| 2017/0261107 | A1 | 9/2017 | Martin | F16J 15/3452 |
| 2017/0350407 | A1 | 12/2017 | Yamamoto et al. | F04D 29/046 |
| 2018/0017163 | A1 | 1/2018 | Hosoe et al. | F16J 15/164 |
| 2018/0073394 | A1 | 3/2018 | Tokunaga et al. | F01D 25/18 |
| 2018/0112711 | A1 | 4/2018 | Itadani | F16J 15/363 |
| 2018/0128377 | A1 | 5/2018 | Tukunaga et al. | F16J 15/342 |
| 2018/0128378 | A1 | 5/2018 | Tokunaga et al. | F16J 15/342 |
| 2018/0135699 | A1 | 5/2018 | Tokunaga et al. | F16C 33/80 |
| 2018/0172162 | A1 | 6/2018 | Tokunaga et al. | F16J 15/34 |
| 2018/0195618 | A1 | 7/2018 | Itadani et al. | F16J 15/3416 |
| 2018/0299015 | A1 | 10/2018 | Itadani | F16J 15/3448 |
| 2019/0169988 | A1 * | 6/2019 | Tokunaga | F01C 1/22 |
| 2019/0170257 | A1 | 6/2019 | Hosoe et al. | F16J 15/3412 |
| 2019/0285115 | A1 | 9/2019 | Negishi et al. | F16C 17/045 |
| 2019/0301522 | A1 | 10/2019 | Negishi et al. | F16C 17/02 |
| 2019/0331162 | A1 | 10/2019 | Negishi | F16J 15/34 |
| 2020/0141444 | A1 | 5/2020 | Thatte | F16C 17/08 |
| 2020/0224768 | A1 | 7/2020 | Imura | F16J 15/3412 |
| 2020/0240470 | A1 | 7/2020 | Sorgenti | F16J 15/3212 |
| 2020/0332901 | A1 | 10/2020 | Imura | F16J 15/3412 |
| 2021/0041026 | A1 | 2/2021 | Imura | F16J 15/3424 |
| 2021/0048062 | A1 | 2/2021 | Masumi et al. | F16C 17/102 |
| 2021/0048106 | A1 | 2/2021 | Imura et al. | F16J 15/3412 |
| 2021/0080009 | A1 | 3/2021 | Kimura et al. | F16J 15/34 |
| 2021/0116030 | A1 | 4/2021 | Kimura et al. | F16J 15/182 |
| 2021/0364034 | A1 | 11/2021 | Okada | F16J 15/342 |
| 2022/0056949 | A1 | 2/2022 | Ikeda et al. | F16C 17/04 |
| 2023/0027772 | A1 | 1/2023 | Suzuki et al. | F16C 17/02 |
| 2023/0258182 | A1 | 8/2023 | Suzuki | F04C 18/0215 |

FOREIGN PATENT DOCUMENTS

| | | | | |
|---|---|---|---|---|
| CN | 1401924 | 3/2003 | | F16J 15/16 |
| CN | 101644333 | 2/2010 | | F16J 15/34 |
| CN | 201496542 | 6/2010 | | F16J 15/16 |
| CN | 101793169 | 8/2010 | | F01D 11/08 |
| CN | 101793324 | 8/2010 | | F16J 15/16 |
| CN | 101861485 | 10/2010 | | F16J 15/34 |
| CN | 203098871 | 7/2013 | | F16J 15/16 |
| CN | 103557229 | 2/2014 | | F16C 17/04 |
| CN | 103557334 | 2/2014 | | F16J 15/34 |
| CN | 203641506 | 6/2014 | | F16J 15/16 |
| CN | 104169622 | 11/2014 | | F16J 15/34 |
| CN | 104321568 | 1/2015 | | F16C 33/72 |
| CN | 104685273 | 6/2015 | | F16J 15/34 |
| CN | 106029294 | 10/2016 | | B23K 26/364 |
| CN | 205877184 | 1/2017 | | F16J 15/16 |
| CN | 205877198 | 1/2017 | | F16J 15/34 |
| CN | 106439023 | 2/2017 | | F16J 15/16 |
| CN | 107489770 | 12/2017 | | F16J 15/34 |
| CN | 109237042 | 1/2019 | | F16J 15/34 |
| CN | 110770456 | 2/2020 | | F16C 33/12 |
| CN | 110925426 | 3/2020 | | F16J 15/16 |
| CN | 111656065 | 9/2020 | | F16J 15/34 |

(56) References Cited

FOREIGN PATENT DOCUMENTS

| | | | |
|---|---|---|---|
| DE | 3223703 | 6/1982 | ............... F16J 15/34 |
| DE | 102008038396 | 2/2010 | |
| EP | 0369295 | 11/1988 | ............... F16J 15/34 |
| EP | 0518681 | 12/1992 | ............... G11B 15/60 |
| EP | 0637706 | 8/1993 | ............... F16J 15/34 |
| EP | 2138225 | 12/2009 | ............... B01J 13/20 |
| EP | 2754931 | 7/2014 | ............... F16J 15/34 |
| EP | 3112078 | 1/2017 | ............ B23K 26/364 |
| EP | 3196516 | 7/2017 | ............... F16J 15/34 |
| EP | 3217049 | 9/2017 | ............... F16J 15/34 |
| EP | 3396186 | 10/2018 | ............... F16C 33/10 |
| EP | 3575621 | 12/2019 | ............... F16C 33/10 |
| EP | 3575643 | 12/2019 | ............... F16J 15/34 |
| EP | 3650722 | 5/2020 | ............... F16C 33/12 |
| FR | 2342440 | 9/1997 | ............... F16J 15/34 |
| GB | 1509482 | 5/1978 | ............... F16C 33/10 |
| GB | 2263952 | 8/1993 | ............... F16J 15/34 |
| JP | H05-296248 | 11/1933 | |
| JP | S51-034974 | 3/1976 | |
| JP | S52-143571 | 10/1977 | ............... F16J 15/26 |
| JP | 57163770 | 10/1982 | ............ F16J 15/3412 |
| JP | S59-195253 | 12/1984 | ............... F16J 15/34 |
| JP | S59-195254 | 12/1984 | ............... F16J 15/34 |
| JP | S61-8402 | 1/1986 | ............... F01C 1/01 |
| JP | S63-134883 | 6/1988 | ............... F04C 18/02 |
| JP | S63-190975 | 8/1988 | ............... F16J 15/34 |
| JP | H02-16381 | 1/1990 | ............... F04C 18/02 |
| JP | H02-236067 | 9/1990 | ............... F16J 15/34 |
| JP | H02-136863 | 11/1990 | ............... F16J 15/34 |
| JP | H04-50559 | 2/1992 | ............... F16J 15/34 |
| JP | H04-337165 | 11/1992 | ............... F16J 15/34 |
| JP | H04-362289 | 12/1992 | ............... F04C 18/02 |
| JP | H05-60247 | 3/1993 | ............... F16J 15/34 |
| JP | H05-90049 | 12/1993 | ............... F16J 15/34 |
| JP | H06-17941 | 1/1994 | ............... F16J 15/34 |
| JP | H06-117547 | 4/1994 | ............... F16J 15/34 |
| JP | H06-174107 | 6/1994 | ............... F16J 15/34 |
| JP | H06-323442 | 11/1994 | ............... F16J 15/34 |
| JP | H06-105105 | 12/1994 | ............... F16J 15/34 |
| JP | H07-43038 | 5/1995 | ............... F16J 15/34 |
| JP | 9-89119 | 3/1997 | ............... F16J 15/34 |
| JP | 9-292034 | 11/1997 | ............... F16J 15/34 |
| JP | H10-281299 | 10/1998 | ............... F16J 15/34 |
| JP | H10-292867 | 11/1998 | |
| JP | H10-339286 | 12/1998 | ............... F04C 18/02 |
| JP | H11-132163 | 5/1999 | ............... F04C 18/02 |
| JP | H11-287329 | 10/1999 | ............... F16J 15/34 |
| JP | H11-303858 | 11/1999 | ............... F16C 17/10 |
| JP | 3066367 | 5/2000 | ............... F16J 15/34 |
| JP | 2001-12458 | 1/2001 | ............... F16C 17/10 |
| JP | 2003-343730 | 12/2003 | ............... F16J 15/22 |
| JP | 2004-360903 | 12/2004 | ............ F16J 15/447 |
| JP | 2005-155894 | 6/2005 | ............... F16C 17/04 |
| JP | 2005-180652 | 7/2005 | ............... F16J 15/34 |
| JP | 2005-315391 | 11/2005 | |
| JP | 2005-337503 | 12/2005 | ............... F16J 15/34 |
| JP | 2006-9614 | 1/2006 | ............... F04C 18/08 |
| JP | 2006-77899 | 3/2006 | ............... F16J 15/34 |
| JP | 2006-90524 | 4/2006 | ............... F16C 17/02 |
| JP | 2006-183702 | 7/2006 | ............... F16C 17/04 |
| JP | 2006-316677 | 11/2006 | ............... F04C 18/02 |
| JP | 2007-162045 | 6/2007 | |
| JP | 2008-51018 | 3/2008 | ............... F04C 18/02 |
| JP | 2008-51030 | 3/2008 | ............... F04C 18/02 |
| JP | 2008-106940 | 5/2008 | ............... F16J 15/34 |
| JP | 2011-74931 | 4/2011 | ............... F16J 15/34 |
| JP | 2011-185292 | 9/2011 | ............... F16J 15/34 |
| JP | 2012-2295 | 1/2012 | ............... F16J 15/34 |
| JP | 2013-062534 | 3/2012 | |
| JP | 2012-82794 | 4/2012 | ............... F04C 18/02 |
| JP | 2012-122135 | 6/2012 | ............... C25D 15/02 |
| JP | 2013-167216 | 8/2013 | ............... F04C 18/02 |
| JP | 2013-213545 | 10/2013 | ............... F16C 32/06 |
| JP | 2014-529052 | 10/2014 | |
| JP | 2015-063647 | 4/2015 | |
| JP | 2015-68330 | 4/2015 | ............... F04C 29/00 |
| JP | 5693599 | 4/2015 | |
| JP | 2015-183631 | 10/2015 | ............... F04C 2/10 |
| JP | 2016-61208 | 4/2016 | ............... F04C 18/02 |
| JP | 2016-800090 | 5/2016 | ............... F16J 15/34 |
| JP | 5960145 | 7/2016 | ............... F16J 15/34 |
| WO | WO2006051702 | 5/2006 | ............... F16J 15/34 |
| WO | WO2011115073 | 9/2011 | ............... F16J 15/34 |
| WO | WO2012046749 | 4/2012 | ............... F16J 15/34 |
| WO | WO2013035503 | 3/2013 | ............... F16J 15/34 |
| WO | WO2013053411 | 4/2013 | |
| WO | WO2014061544 | 4/2014 | |
| WO | WO2014148316 | 9/2014 | ............... F16J 15/34 |
| WO | WO2014148317 | 9/2014 | ............... F16J 15/34 |
| WO | WO2014174725 | 10/2014 | ............... F16J 15/34 |
| WO | WO2015111707 | 7/2015 | ............... F16J 15/18 |
| WO | WO2016035860 | 3/2016 | ............... F16J 15/34 |
| WO | WO2016167262 | 10/2016 | ............... F16J 15/34 |
| WO | WO2016186015 | 11/2016 | ............... F16J 15/34 |
| WO | WO2016186019 | 11/2016 | ............... F16J 15/34 |
| WO | WO2016186020 | 11/2016 | ............... F16J 15/34 |
| WO | WO2016203878 | 12/2016 | ............... F16J 15/34 |
| WO | WO2017002774 | 1/2017 | ............... F16J 15/34 |
| WO | WO2017061406 | 4/2017 | ............... F16J 15/34 |
| WO | WO2018025629 | 2/2018 | ............... F02B 55/02 |
| WO | WO2018092742 | 5/2018 | ............... F16J 15/34 |
| WO | WO2018105505 | 6/2018 | ............... F16J 33/12 |
| WO | WO2018139231 | 8/2018 | ............... F16J 15/34 |
| WO | WO2020129846 | 6/2020 | ............... F16C 17/04 |
| WO | WO2021125201 | 6/2021 | ............... F16J 15/18 |

OTHER PUBLICATIONS

International Preliminary Report on Patentability issued in PCT/JP2021/024940, dated Jan. 10, 2023, 4 pages.
International Search Report and Written Opinion issued in PCT/JP2021/024941, dated Sep. 14, 2021, with English translation, 13 pages.
International Preliminary Report on Patentability issued in PCT/JP2021/024941, dated Jan. 10, 2023, 5 pages.
International Search Report and Written Opinion issued in PCT/JP2021/024938, dated Aug. 3, 2021, with English translation, 12 pages.
International Preliminary Report on Patentability issued in PCT/JP2021/024938, dated Jan. 10, 2023, 4 pages.
International Search Report and Written Opinion issued in PCT/JP2021/024945, dated Sep. 7, 2021, with English translation, 16 pages.
International Preliminary Report on Patentability issued in PCT/JP2021/024945, dated Jan. 10, 2023, 6 pages.
International Search Report and Written Opinion issued in PCT/JP2021/024943, dated Sep. 7, 2021, with English translation, 13 pages.
International Preliminary Report on Patentability issued in PCT/JP2021/024943, dated Jan. 10, 2023, 5 pages.
International Search Report and Written Opinion issued in PCT/JP2021/024944, dated Jul. 27, 2021, with English translation, 11 pages.
International Preliminary Report on Patentability issued in PCT/JP2021/024944, dated Jan. 10, 2023, 4 pages.
U.S. Appl. No. 18/012,853, filed Dec. 23, 2022, Suzuki.
U.S. Appl. No. 18/012,856, filed Dec. 23, 2022, Suzuki.
U.S. Appl. No. 18/012,857, filed Dec. 23, 2022, Suzuki.
U.S. Appl. No. 18/013,513, filed Dec. 28, 2022, Suzuki.
U.S. Appl. No. 18/013,520, filed Dec. 28, 2022, Suzuki.
Official Action issued in related U.S. Appl. No. 18/012,853, dated Sep. 8, 2023, 11 pages.
Official Action issued in related U.S. Appl. No. 18/012,857, dated Oct. 5, 2023, 11 pages.
Official Action issued in related U.S. Appl. No. 18/012,856, dated Sep. 11, 2023, 8 pages.

* cited by examiner

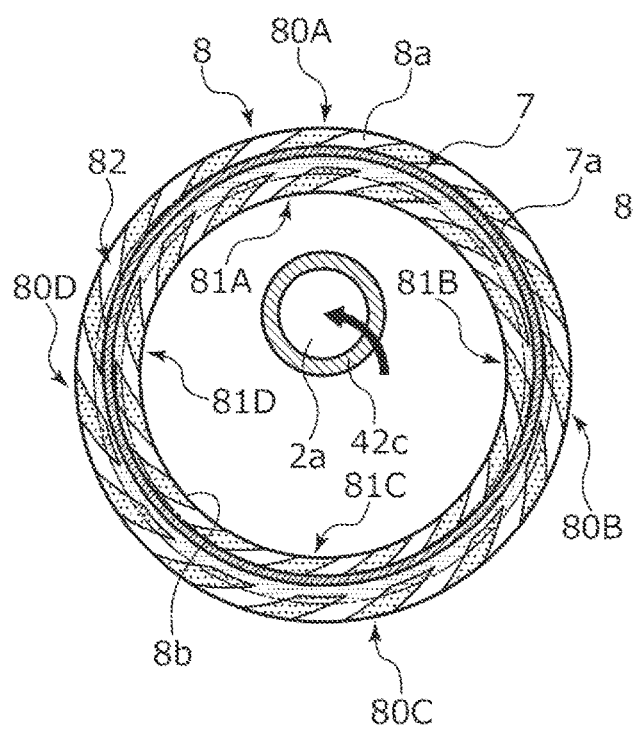
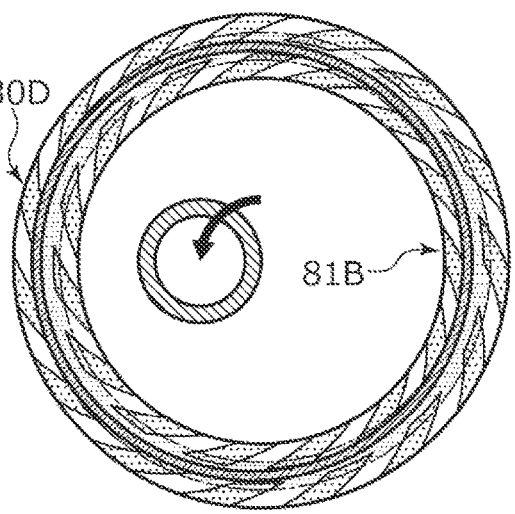
Fig. 4(a)　　　　　　　　Fig. 4(b)
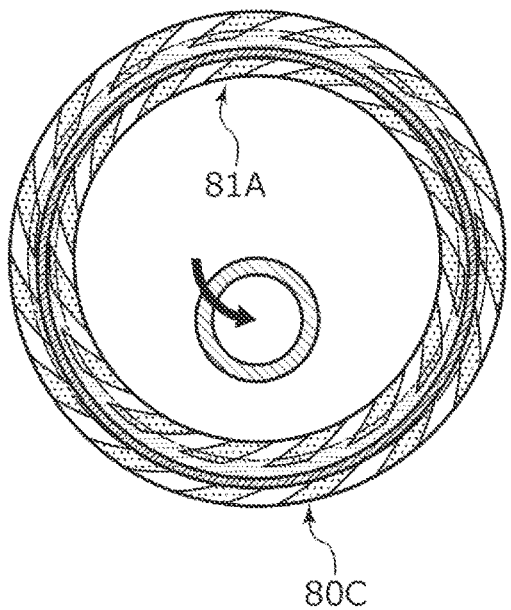
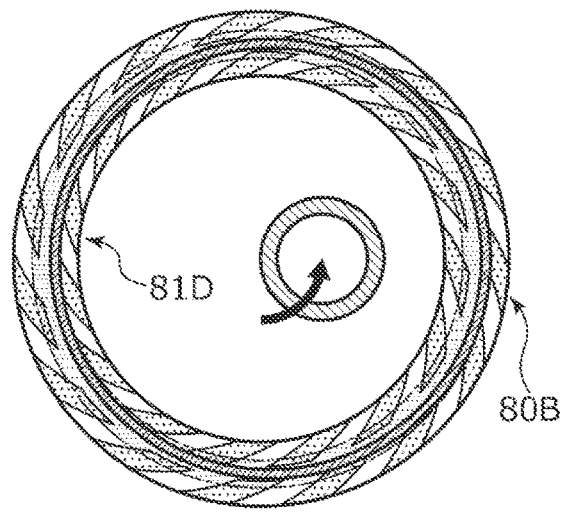
Fig. 4(c)　　　　　　　　Fig. 4(d)

SLIDING COMPONENT

TECHNICAL FIELD

The present invention relates to a sliding component used in a rotating machine including an eccentric mechanism.

BACKGROUND ART

Machines entailing rotational driving and used in various industrial fields include not only a rotating machine rotating with its central axis held at a fixed position but also a rotating machine rotating with its central axis entailing eccentricity. The rotating machine rotating with eccentricity is, for example, a scroll compressor. This type of compressor is provided with, for example, a scroll compression mechanism including a fixed scroll having a spiral lap on the surface of an end plate and a movable scroll having a spiral lap on the surface of an end plate and an eccentric mechanism eccentrically rotating a rotary shaft. By the rotary shaft rotating, the movable scroll is slid relative to the fixed scroll with eccentric rotation. As a result, in this mechanism, the fluid supplied from the low-pressure chamber on the outer diameter side of the two scrolls is pressurized and a high-pressure fluid is discharged from the discharge hole formed in the middle of the fixed scroll.

These scroll compressors using the mechanism in which the movable scroll is slid relative to the fixed scroll with eccentric rotation are widely used in, for example, refrigeration cycles because the compressors are highly efficient in terms of compression and cause little noise. However, the compressors are problematic in that a refrigerant leaks from the axial gap between the two scrolls. The scroll compressor described in Patent Citation 1 includes a thrust plate sliding relative to a movable scroll on the back surface side of the movable scroll. A part of a refrigerant compressed by a scroll compression mechanism is supplied to the back pressure chamber formed on the back surface side of the thrust plate, and the movable scroll is pressed toward a fixed scroll. As a result, it is possible to reduce the leakage of the refrigerant from the axial gap between the two scrolls when the refrigerant is compressed.

CITATION LIST

Patent Literature

Patent Citation 1: JP 2016-61208 A (Pages 5 to 6, FIG. 1)

SUMMARY OF INVENTION

Technical Problem

In the scroll compressor described in Patent Citation 1, a part of the refrigerant compressed by the scroll compression mechanism is used to press the movable scroll from the back surface side toward the fixed scroll via the thrust plate. Accordingly, although the refrigerant leakage from the inter-scroll axial gap can be reduced, a pressing force acts from both axial sides between the two scrolls, especially on the sliding surface that entails the eccentric rotation between the movable scroll and the thrust plate. As a result, there is a problem that an increase in frictional resistance occurs, a smooth operation of the movable scroll is hindered, and the efficiency of compression cannot be enhanced.

The present invention has been made in view of such a problem, and an object of the present invention is to provide a sliding component capable of stably reducing the frictional resistance between sliding surfaces entailing eccentric rotation.

Solution to Problem

In order to solve the above problem, a sliding component according to the present invention is a sliding component having a sliding surface sliding relatively to a facing sliding surface with eccentric rotation, wherein the sliding surface is provided with a plurality of dynamic pressure generation grooves arranged in a circumferential direction and each having, in a plan view, a tapered portion configured to become narrower toward a downstream side in an eccentric rotation direction of the facing sliding surface relatively to the sliding surface. According to the aforesaid feature of the present invention, when the facing sliding surface is slid relative to the sliding surface with eccentric rotation, the fluid in the dynamic pressure generation groove is collected in the tapered portion forming a tapered shape toward the downstream side in the relative eccentric rotation direction of the sliding surface and the facing sliding surface in the dynamic pressure generation groove, and dynamic pressure can be reliably generated at the part of the dynamic pressure generation groove on the downstream side in the relative eccentric rotation direction. According to this, lubricity is improved by separating the sliding surfaces from each other, and the frictional resistance between the sliding surfaces can be reduced.

It may be preferable that an end portion of each of the dynamic pressure generation grooves on the downstream side in the eccentric rotation direction is an acute-angled corner portion. According to this preferable configuration, the fluid in the dynamic pressure generation groove is collected at the acute-angled corner portion, and a large dynamic pressure can be generated in the corner portion.

It may be preferable that each of the dynamic pressure generation grooves communicates with an external space on an inner diameter side or an outer diameter side of the sliding surface. According to this preferable configuration, a fluid can be introduced into the dynamic pressure generation groove from the external space, and thus dynamic pressure can be reliably generated in the dynamic pressure generation groove.

It may be preferable that the sliding surface and the facing sliding surface slide relative to each other with eccentric rotation such that the facing sliding surface overlaps with part of the plurality of dynamic pressure generation grooves and the facing sliding surface does not overlap with remains of the dynamic pressure generation grooves at any moment. According to this preferable configuration, in the relative sliding of the sliding surface and the facing sliding surface entailing eccentric rotation, dynamic pressure is generated only in some of the dynamic pressure generation grooves that the facing sliding surface overlaps and no dynamic pressure is generated in the other dynamic pressure generation grooves that the facing sliding surface does not overlap among the plurality of dynamic pressure generation grooves disposed in the circumferential direction of the sliding surface. According to this, unintended negative pressure generation can be prevented in the other dynamic pressure generation grooves.

It may be preferable that the dynamic pressure generation grooves are arranged in the circumferential direction on one of an inner diameter side and an outer diameter side of the sliding surface, and the sliding surface is further provided with a plurality of other dynamic pressure generation grooves arranged in the circumferential direction on remaining one of the inner diameter side and the outer diameter side of the sliding surface and each having, in a plan view, a tapered portion configured to become narrower toward the upstream side in the eccentric rotation direction of the facing sliding surface relatively to the sliding surface. According to this preferable configuration, dynamic pressure can be generated by the respective dynamic pressure generation grooves on the outer diameter side and the inner diameter side of the sliding surface.

It may be preferable that adjacent two of the tapered portions of the dynamic pressure generation grooves and the other dynamic pressure generation grooves in a radial direction are formed so as to face in opposite directions in the eccentric rotation direction. According to this preferable configuration, dynamic pressure can be generated in the tapered portions of the dynamic pressure generation groove and the other dynamic pressure generation groove adjacent to each other in the radial direction, and thus the sliding surfaces are separated from each other with inclination suppressed.

It may be preferable that the dynamic pressure generation grooves and the other dynamic pressure generation grooves are radially separated from each other with a separation width larger than a radial width of the facing sliding surface formed in an annular shape. According to this preferable configuration, no annular facing sliding surface is disposed over the dynamic pressure generation groove and the other dynamic pressure generation groove adjacent to each other in the radial direction, and thus simultaneous positive and negative pressure generation can be prevented in the dynamic pressure generation groove and the other dynamic pressure generation groove adjacent to each other in the radial direction.

It may be preferable that a plurality of non-communication grooves surrounded by a land partitioning the dynamic pressure generation grooves and the other dynamic pressure generation grooves are provided in the circumferential direction between the dynamic pressure generation grooves and the other dynamic pressure generation grooves. According to this preferable configuration, the facing sliding surface that performs an eccentric rotation motion overlaps any of the dynamic pressure generation groove, the other dynamic pressure generation groove, and the non-communication groove over the circumferential direction, and thus dynamic pressure is generated over the circumferential direction between the sliding surfaces regardless of the relative positions of the sliding surface and the facing sliding surface.

It may be preferable that a plurality of the non-communication grooves are radially arranged between adjacent two of the dynamic pressure generation grooves and the other dynamic pressure generation grooves in the radial direction, and the non-communication grooves arranged in the radial direction are different in shape. According to this preferable configuration, the dynamic pressure generated in accordance with the relative positions of the sliding surface and the facing sliding surface can be changed.

BRIEF DESCRIPTION OF DRAWINGS

FIG. 4 is a diagram illustrating relative sliding between a sliding surface of a side seal and the sliding surface of the thrust plate as a sliding component according to the first embodiment of the present invention. It should be noted that FIG. 4A illustrates the start position of the relative sliding and FIGS. 4B to 4D illustrate the positional relationships between the relatively sliding surfaces of the side seal and the thrust plate at an eccentric rotary shaft rotation of 90, 180, and 270 degrees, respectively.

DESCRIPTION OF EMBODIMENTS

Figure 1:
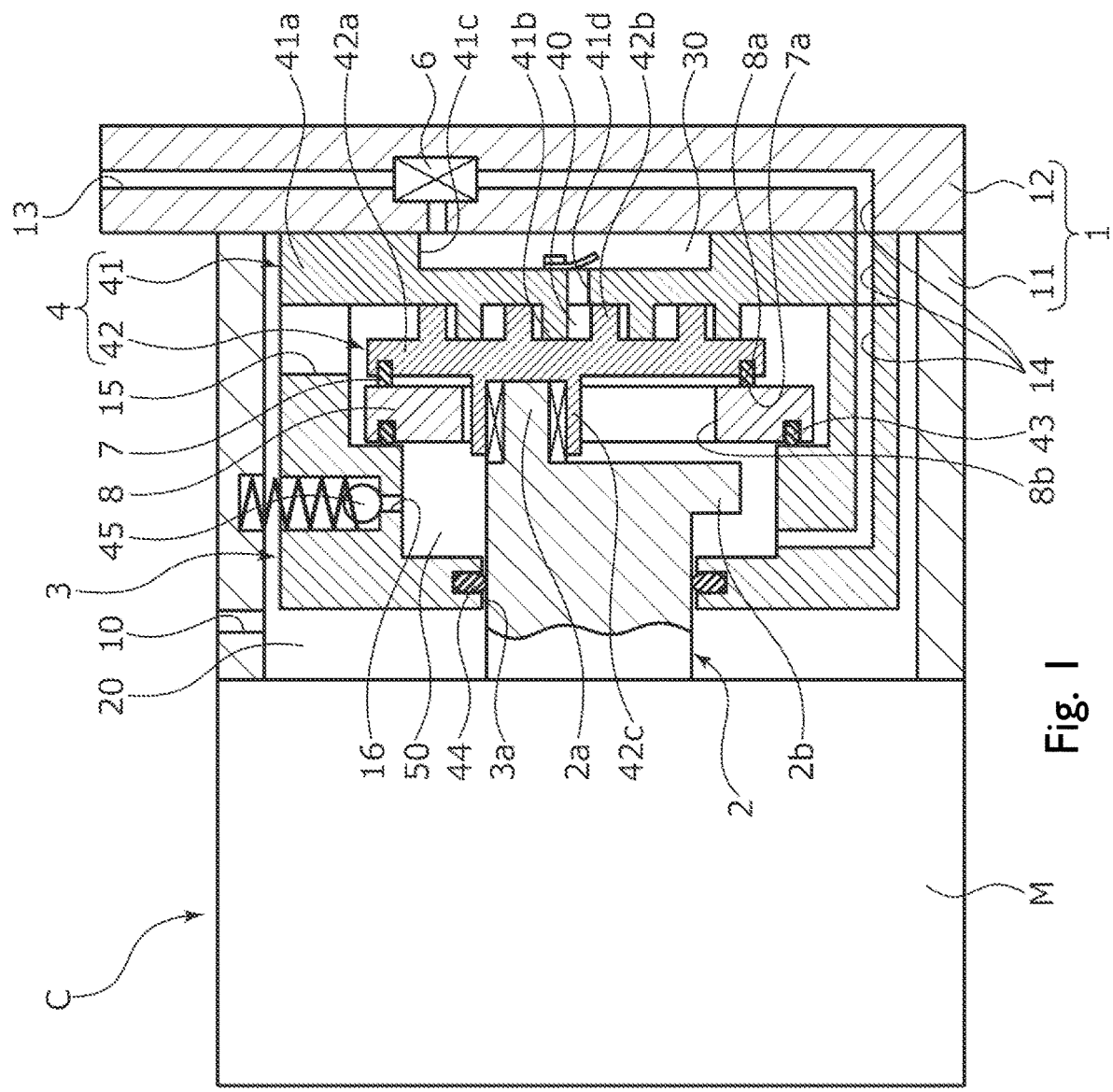
FIG. 1 is a schematic configuration diagram illustrating a scroll compressor to which a thrust plate as a sliding component according to a first embodiment of the present invention is applied.

Modes for implementing the sliding component according to the present invention will be described below based on embodiments.

First Embodiment

The sliding component according to a first embodiment of the present invention will be described with reference to FIGS. 1 to 6. It should be noted that in the drawings, the groove formed in the sliding surface of the sliding component or the like is dotted for convenience of description.

The sliding component according to the first embodiment of the present invention is applied to a rotating machine including an eccentric mechanism such as a scroll compressor C that suctions, compresses, and discharges a refrigerant as a fluid used in the air conditioning system of an automobile or the like. It should be noted that the refrigerant in the present embodiment is a gas mixed with a mist-like lubricating oil.

First, the scroll compressor C will be described. As illustrated in FIG. 1, the scroll compressor C mainly includes a housing 1, a rotary shaft 2, an inner casing 3, a scroll compression mechanism 4, a side seal 7, a thrust plate 8 as a sliding component, and a drive motor M.

The housing 1 includes a cylindrical casing 11 and a cover 12. The cover 12 blocks an opening of the casing 11. In addition, the drive motor M blocks the opening in the casing 11 that is on the side axially opposite to the opening in the casing 11 that is blocked by the cover 12.

Formed in the casing 11 are a low-pressure chamber 20, a high-pressure chamber 30, and a back pressure chamber 50. A low-pressure refrigerant is supplied from a refrigerant circuit (not illustrated) to the low-pressure chamber 20 as the external space on the low-pressure side through a suction port 10. A high-pressure refrigerant compressed by the scroll compression mechanism 4 is discharged to the high-pressure chamber 30. A part of the refrigerant compressed by the scroll compression mechanism 4 is supplied, together with lubricating oil, to the back pressure chamber 50 as the external space on the high-pressure side. It should be noted that the back pressure chamber 50 is formed in the cylindrical inner casing 3 accommodated in the casing 11.

A discharge communication passage 13 is formed in the cover 12. The discharge communication passage 13 allows the refrigerant circuit (not illustrated) and the high-pressure chamber 30 to communicate with each other. In addition, a part of a back pressure communication passage 14 for communication between the high-pressure chamber 30 and the back pressure chamber 50 is formed in the cover 12 by branching off from the discharge communication passage 13. It should be noted that the discharge communication passage 13 is provided with an oil separator 6 for lubricating oil separation from a refrigerant.

The inner casing 3 is fixed with an axial end portion of the inner casing 3 abutting against an end plate 41a of a fixed scroll 41 constituting the scroll compression mechanism 4. In addition, the inner casing 3 has a side wall where a suction communication passage 15 penetrating the wall in the radial direction is formed. In other words, the low-pressure chamber 20 is formed from the outside of the inner casing 3 to the inside of the inner casing 3 via the suction communication passage 15. The refrigerant supplied to the inside of the inner casing 3 through the suction communication passage 15 is suctioned into the scroll compression mechanism 4.

The scroll compression mechanism 4 mainly includes the fixed scroll 41 and a movable scroll 42. The fixed scroll 41 is fixed to the cover 12 in a substantially sealed shape. The movable scroll 42 is accommodated in the inner casing 3.

The fixed scroll 41 is made of metal and includes a spiral lap 41b. The spiral lap 41b projects toward the movable scroll 42 from the surface of the disk-shaped end plate 41a, that is, the end plate 41a. In addition, the fixed scroll 41 has a recessed portion 41c where the inner diameter side of the back surface of the end plate 41a, that is, the end surface of the end plate 41a that abuts against the cover 12 is recessed in the direction opposite to the cover 12. The high-pressure chamber 30 is defined from the recessed portion 41c and the cover 12.

The movable scroll 42 is made of metal and includes a spiral lap 42b. The spiral lap 42b projects toward the fixed scroll 41 from the surface of a disk-shaped end plate 42a, that is, the end plate 42a. In addition, a boss 42c protruding from the middle of the back surface of the end plate 42a is formed on the movable scroll 42. An eccentric portion 2a formed on the rotary shaft 2 is fitted into the boss 42c so as to be relatively rotatable. It should be noted that an eccentric mechanism causing the rotary shaft 2 to perform eccentric rotation is configured by the eccentric portion 2a of the rotary shaft 2 and a counterweight portion 2b protruding in the outer diameter direction from the rotary shaft 2 in the present embodiment.

When the rotary shaft 2 is rotationally driven by the drive motor M, the eccentric portion 2a rotates eccentrically and the movable scroll 42 slides, in a posture-maintained state, relative to the fixed scroll 41 with the eccentric rotation. At this time, the movable scroll 42 rotates eccentrically with respect to the fixed scroll 41 and, with this rotation, the contact positions of the laps 41b and 42b sequentially move in the rotation direction and a compression chamber 40 formed between the laps 41b and 42b gradually shrinks while moving toward the middle. As a result, the refrigerant suctioned into the compression chamber 40 from the low-pressure chamber 20 formed on the outer diameter side of the scroll compression mechanism 4 is compressed and, finally, the high-pressure refrigerant is discharged to the high-pressure chamber 30 through a discharge hole 41d provided in the middle of the fixed scroll 41.

Next, the side seal 7 will be described. The side seal 7 is made of resin and has a rectangular cross section and an annular shape in an axial view (see FIG. 4). In addition, the side seal 7 is fixed to the back surface of the end plate 42a of the movable scroll 42.

The side seal 7 has a sliding surface 7a as a facing sliding surface abutting against a sliding surface 8a of the thrust plate 8, and the sliding surface 7a is formed on a flat surface without unevenness or the like.

Next, the thrust plate 8 as a sliding component in the present embodiment will be described. It should be noted that FIG. 3B illustrates a state where the A-A cross-sectional view is linearly unfolded for convenience of description.

Figure 2:
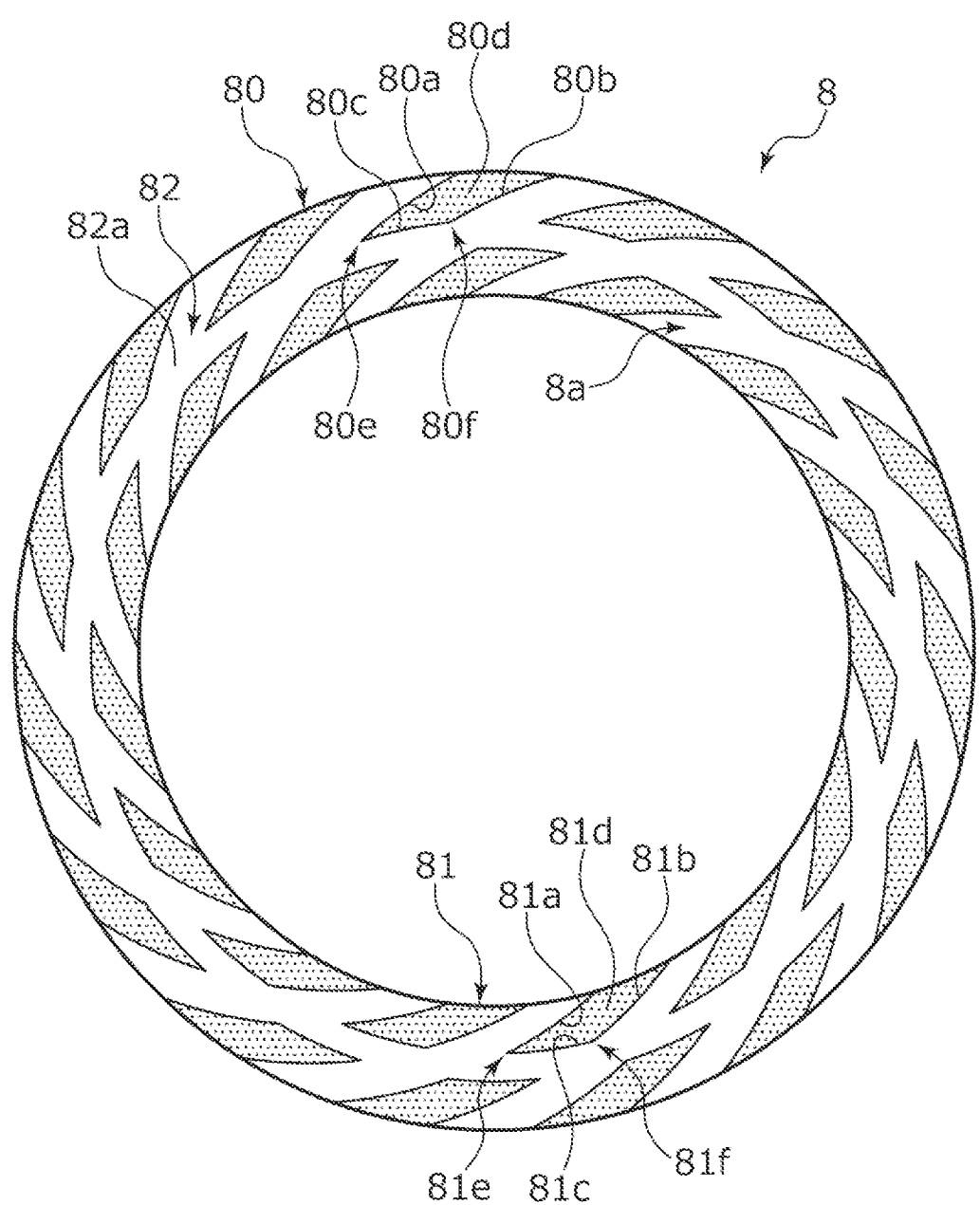
FIG. 2 is a diagram illustrating a sliding surface of the thrust plate in the first embodiment of the present invention.

Referring to FIGS. 2 and 3, the thrust plate 8 is made of metal and has an annular shape. The thrust plate 8 has the sliding surface 8a abutting against the sliding surface 7a of the side seal 7 (see FIG. 1).

As illustrated in FIG. 2, the sliding surface 8a of the thrust plate 8 includes an external dynamic pressure generation groove 80, an internal dynamic pressure generation groove 81, and a land 82. A plurality of the (15 in the present embodiment) external dynamic pressure generation grooves 80 as dynamic pressure generation grooves are provided on the outer diameter side of the sliding surface 8a. A plurality of the (15 in the present embodiment) internal dynamic pressure generation grooves 81 as other dynamic pressure generation grooves are provided on the inner diameter side of the sliding surface 8a. The land 82 partitions the external dynamic pressure generation groove 80 and the internal dynamic pressure generation groove 81.

The external dynamic pressure generation groove 80 extends from the outer diameter end edge of the sliding surface 8a toward the inner diameter side while being inclined in the circumferential direction. In addition, the external dynamic pressure generation groove 80 communicates with the low-pressure chamber 20 (see FIG. 1) as an external space on the outer diameter side.

Specifically, the external dynamic pressure generation groove 80 is partitioned by side walls 80a and 80b, an inner end wall 80c, and a bottom wall 80d. The side walls 80a and 80b extend in the depth direction orthogonal to a flat surface 82a of the land 82 and extend from the outer diameter end edge of the sliding surface 8a toward the inner diameter side in the counterclockwise direction while being inclined in the circumferential direction. The inner end wall 80c interconnects the inner diameter end portions of the side walls 80a and 80b. The bottom wall 80d extends parallel to the surface 82a and interconnects the depth-direction end portions of the side walls 80a and 80b and the inner end wall 80c.

The inner end wall 80c is shorter than the side walls 80a and 80b and extends substantially along the circumferential direction. In addition, the inner end wall 80c is smaller in circumferentially inclined component than the side walls 80a and 80b.

In addition, a corner portion 80e formed by the side wall 80a and the inner end wall 80c has an acute angle, and a corner portion 80f formed by the side wall 80b and the inner end wall 80c has an obtuse angle.

In other words, the external dynamic pressure generation groove 80 extends in a tapered shape toward the counterclockwise direction. In other words, the corner portion 80e functions as the tapered portion of the external dynamic pressure generation groove 80. It should be noted that the tapering toward the counterclockwise direction (that is, the downstream side in the eccentric rotation direction) means that the angle formed by the two side walls facing the eccentric rotation direction in the side wall of each groove (that is, two side walls facing the circumferential and radial components in the eccentric rotation direction in any state) is smaller than 180 degrees. The presence of the corner portion smaller than 180 degrees allows fluid collection and dynamic pressure generation. Further, in a case where the corner portion has an acute angle, fluid leakage out of the groove is unlikely and dynamic pressure can be generated efficiently. Please note that the downstream side in the eccentric rotation direction means a downstream side in a movement direction of the sliding surface 7a along an orbit of the sliding surface 7a sliding relatively to the sliding surface 8a.

Meanwhile, the internal dynamic pressure generation groove 81 extends from the inner diameter end edge of the sliding surface 8a toward the outer diameter side while being inclined in the circumferential direction. In addition, the internal dynamic pressure generation groove 81 communicates with the back pressure chamber 50 (see FIG. 1) as an external space on the inner diameter side.

Specifically, the internal dynamic pressure generation groove 81 is partitioned by side walls 81a and 81b, an outer end wall 81c, and a bottom wall 81d. The side walls 81a and 81b extend in the depth direction orthogonal to the flat surface 82a of the land 82. In addition, the side walls 81a and 81b extend from the inner diameter end edge of the sliding surface 8a toward the outer diameter side in the clockwise direction while being inclined in the circumferential direction. The outer end wall 81c interconnects the outer diameter end portions of the side walls 81a and 81b. The bottom wall 81d extends parallel to the surface 82a and interconnects the depth-direction end portions of the side walls 81a and 81b and the outer end wall 81c.

The outer end wall 81c is shorter than the side walls 81a and 81b and extends substantially along the circumferential direction. In addition, the outer end wall 81c is smaller in inclined component than the side walls 81a and 81b. In addition, a corner portion 81e formed by the side wall 81a and the outer end wall 81c has an acute angle, and a corner portion 81f formed by the side wall 81b and the outer end wall 81c has an obtuse angle.

In other words, the internal dynamic pressure generation groove 81 extends in a tapered shape toward the clockwise direction. In other words, the corner portion 81e forming an acute angle functions as the tapered portion of the internal dynamic pressure generation groove 81, and the tapered portion of the external dynamic pressure generation groove 80 and the tapered portion of the internal dynamic pressure generation groove 81 face in opposite directions in the circumferential direction.

Figure 3A:
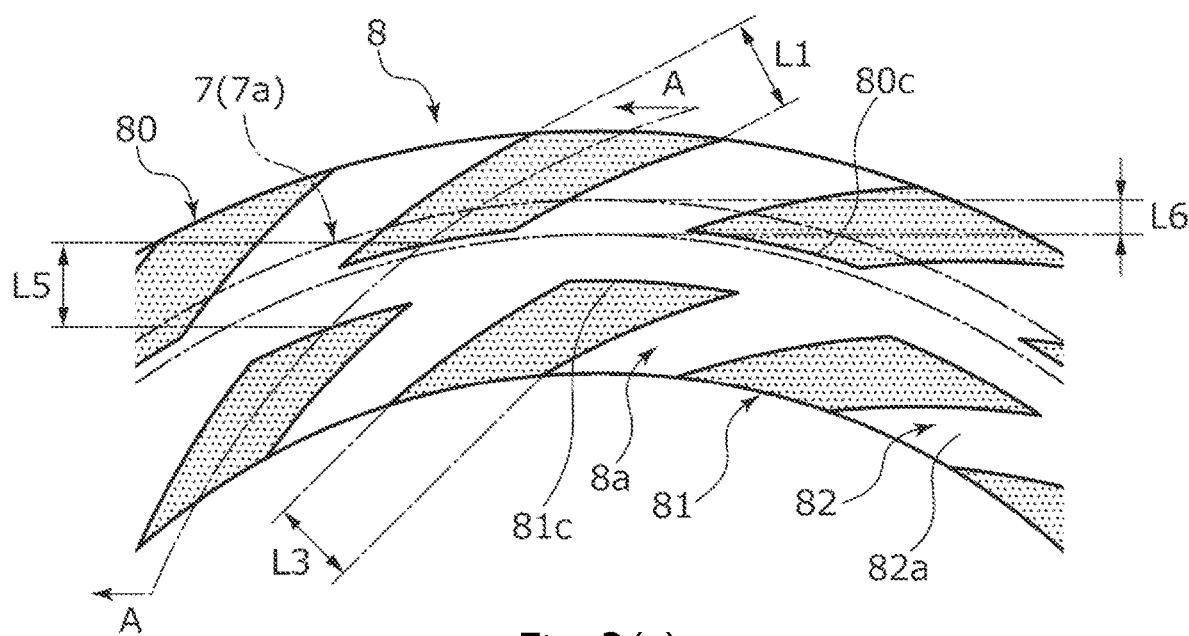
FIG. 3A is an enlarged view of a dynamic pressure generation groove in the first embodiment of the present invention.
Figure 3B:
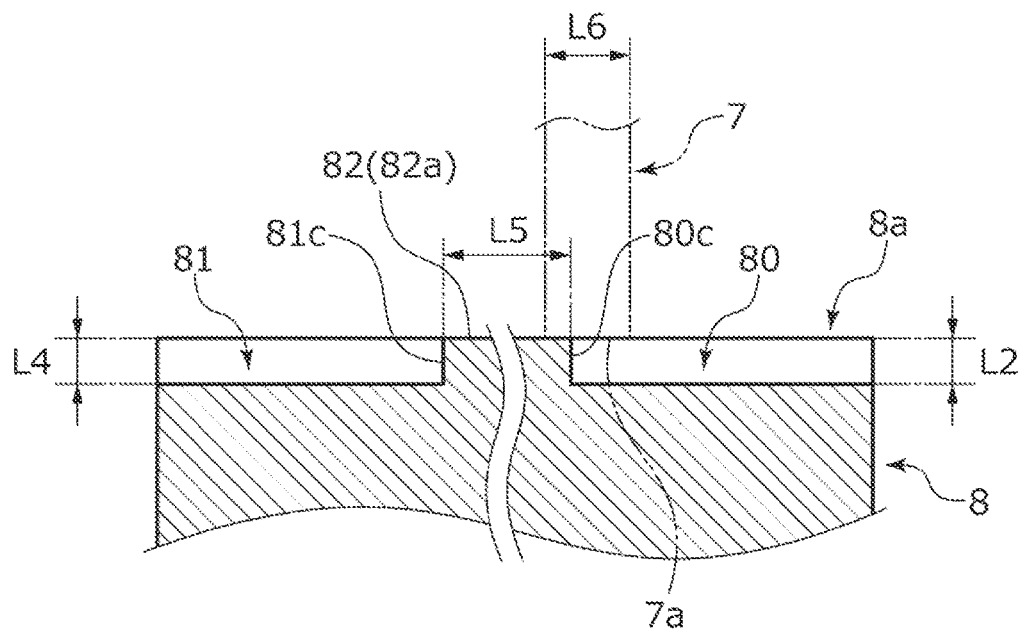
FIG. 3B is a cross-sectional view taken along line A-A.

As illustrated in FIGS. 3A and 3B, a width dimension L1 of the external dynamic pressure generation groove 80 (that is, the separation width of the side walls 80a and 80b) is formed larger than a depth dimension L2 of the external dynamic pressure generation groove 80 (i.e., L1>L2). It should be noted that here, the width dimension of the opening portion of the external dynamic pressure generation groove 80 is illustrated as the width dimension L1 of the external dynamic pressure generation groove 80.

In addition, a width dimension L3 of the internal dynamic pressure generation groove 81 (that is, the separation width of the side walls 81a and 81b) is formed larger than a depth dimension L4 of the internal dynamic pressure generation groove 81 (i.e., L3>L4). It should be noted that here, the width dimension of the opening portion of the internal dynamic pressure generation groove 81 is illustrated as the width dimension L3 of the internal dynamic pressure generation groove 81.

It should be noted that the width dimensions L1 and L3 are preferably 10 times or more the depth dimensions L2 and L4 although the width and depth dimensions of the external dynamic pressure generation groove 80 and the internal dynamic pressure generation groove 81 can be freely changed on condition that the width dimensions of the external dynamic pressure generation groove 80 and the internal dynamic pressure generation groove 81 are formed larger than the depth dimensions of the external dynamic pressure generation groove 80 and the internal dynamic pressure generation groove 81. Further, it should be noted that the width dimensions L1 and L3 may be equal to or different from each other. In addition, the depth dimensions L2 and L4 may be equal to or different from each other.

In addition, the inner end wall 80c of the external dynamic pressure generation groove 80 and the outer end wall 81c of the internal dynamic pressure generation groove 81 are separated from each other in the radial direction, and the external dynamic pressure generation groove 80 and the internal dynamic pressure generation groove 81 have a radial separation width L5 formed larger than a radial width L6 of the sliding surface 7a of the side seal 7 (L5>L6).

Referring to FIG. 1, a seal ring 43 is fixed to the thrust plate 8. The seal ring 43 abuts against the inner peripheral surface of the inner casing 3 on the surface on the side axially opposite to the sliding surface 8a. As a result, the thrust plate 8 functions as a thrust bearing that receives an axial load of the movable scroll 42 via the side seal 7.

In addition, the side seal 7 and the seal ring 43 partition the low-pressure chamber 20 formed on the outer diameter side of the movable scroll 42 and the back pressure chamber 50 formed on the back surface side of the movable scroll 42 in the inner casing 3. The back pressure chamber 50 is a closed space formed between the inner casing 3 and the rotary shaft 2. A seal ring 44 is fixed to the inner periphery of a through hole 3a provided in the middle of the other end of the inner casing 3 and is in sliding contact in a sealed shape with the rotary shaft 2 inserted through the through hole 3a. In addition, the back pressure communication passage 14 allowing the high-pressure chamber 30 and the back pressure chamber 50 to communicate with each other is formed over the cover 12, the fixed scroll 41, and the inner casing 3. In addition, the back pressure communication passage 14 is provided with an orifice (not illustrated) and, after depressurization adjustment by means of the orifice, the refrigerant in the high-pressure chamber 30 is supplied to the back pressure chamber 50 together with the lubricating oil separated by the oil separator 6. At this time, the pressure in the back pressure chamber 50 is adjusted to be higher than the pressure in the low-pressure chamber 20. It should be noted that a pressure release hole 16 is formed in the inner casing 3, penetrates the inner casing 3 in the radial direction, and allows the low-pressure chamber 20 and the back pressure chamber 50 to communicate with each other. In addition, a pressure adjustment valve 45 is provided in the pressure release hole 16. The pressure adjustment valve 45 is opened by the pressure of the back pressure chamber 50 exceeding a set value.

In addition, the boss 42c of the movable scroll 42 is inserted through a through hole 8b in the middle of the thrust plate 8. The through hole 8b is formed to have a diameter size at which it is possible to allow eccentric rotation by the eccentric portion 2a of the rotary shaft 2 fitted into the boss 42c. In other words, the sliding surface 7a of the side seal 7 is capable of sliding relative to the sliding surface 8a of the thrust plate 8 with eccentric rotation by the eccentric rotation of the rotary shaft 2 (see FIG. 4).

It should be noted that FIGS. 4A to 4D in FIG. 4 illustrate the rotational trajectory of the boss 42c that is viewed from the fixed scroll 41 side. Respectively illustrated in FIGS. 4B to 4D are the boss 42c rotated counterclockwise by 90 degrees, 180 degrees, and 270 degrees with FIG. 4A serving as a reference. In addition, the sliding region between the sliding surface 7a of the side seal 7 and the sliding surface 8a of the thrust plate 8 is schematically illustrated by dots. In addition, regarding the rotary shaft 2, the counterweight portion 2b constituting the eccentric mechanism and so on are not illustrated and only the eccentric portion 2a fitted into the boss 42c is illustrated for convenience of description.

As described above, the thrust plate 8 is a sliding component having the sliding surface 8a sliding relative to the eccentric rotation of the sliding surface 7a of the side seal 7.

It should be noted that hereinafter, when the thrust plate 8 is regarded as an analog clock, directly above the paper surface is the 12 o'clock position and, in the sliding surface 8a, the plurality of external dynamic pressure generation grooves near 12 o'clock are referred to as external dynamic pressure generation grooves 80A, the plurality of external dynamic pressure generation grooves near 3 o'clock are referred to as external dynamic pressure generation grooves 80B, the plurality of external dynamic pressure generation grooves near 6 o'clock are referred to as external dynamic pressure generation grooves 80C, and the plurality of external dynamic pressure generation grooves near 9 o'clock are referred to as external dynamic pressure generation grooves 80D. In addition, in the sliding surface 8a, the plurality of internal dynamic pressure generation grooves near 12 o'clock are referred to as internal dynamic pressure generation grooves 81A, the plurality of internal dynamic pressure generation grooves near 3 o'clock are referred to as internal dynamic pressure generation grooves 81B, the plurality of internal dynamic pressure generation grooves near 6 o'clock are referred to as internal dynamic pressure generation grooves 81C, and the plurality of internal dynamic pressure generation grooves near 9 o'clock are referred to as internal dynamic pressure generation grooves 81D.

Specifically, in the state of FIG. 4A, the sliding surface 7a overlaps the plurality of external dynamic pressure generation grooves 80A at the part of the sliding surface 8a near 10 o'clock to 2 o'clock. At the part of the sliding surface 8a near 3 o'clock, the sliding surface 7a is disposed on the land 82 between the external dynamic pressure generation groove 80B and the internal dynamic pressure generation groove 81B without overlapping the external dynamic pressure generation groove 80B and the internal dynamic pressure generation groove 81B. At the part of the sliding surface 8a near 4 o'clock to 8 o'clock, the sliding surface 7a overlaps the plurality of internal dynamic pressure generation grooves 81C. At the part of the sliding surface 8a near 9 o'clock, the sliding surface 7a is disposed on the land 82 between the external dynamic pressure generation groove 80D and the internal dynamic pressure generation groove 81D without overlapping the external dynamic pressure generation groove 80D and the internal dynamic pressure generation groove 81D.

In other words, in the state of FIG. 4A, the sliding surface 7a overlaps the external dynamic pressure generation grooves 80A, which are a part of the external dynamic pressure generation grooves 80A to 80D, and does not overlap the other external dynamic pressure generation grooves 80B to 80D. Further, the sliding surface 7a overlaps the internal dynamic pressure generation grooves 81C, which are a part of the internal dynamic pressure generation grooves 81A to 81D, and does not overlap the other internal dynamic pressure generation grooves 81A, 81B, and 81D.

In addition, in the state of FIG. 4B, at the part of the sliding surface 8a near 12 o'clock, the sliding surface 7a is disposed on the land 82 between the external dynamic pressure generation groove 80A and the internal dynamic pressure generation groove 81A without overlapping the external dynamic pressure generation groove 80A and the internal dynamic pressure generation groove 81A. At the part of the sliding surface 8a near 1 o'clock to 5 o'clock, the sliding surface 7a overlaps the plurality of internal dynamic pressure generation grooves 81B. At the part of the sliding surface 8a near 6 o'clock, the sliding surface 7a is disposed on the land 82 between the external dynamic pressure generation groove 80C and the internal dynamic pressure generation groove 81C without overlapping the external dynamic pressure generation groove 80C and the internal dynamic pressure generation groove 81C. At the part of the sliding surface 8a near 7 o'clock to 11 o'clock, the sliding surface 7a overlaps the plurality of external dynamic pressure generation grooves 80D.

In other words, in the state of FIG. 4B, the sliding surface 7a overlaps the external dynamic pressure generation grooves 80D, which are a part of the external dynamic pressure generation grooves 80A to 80D, and does not overlap the other external dynamic pressure generation grooves 80A to 80C. Further, the sliding surface 7a overlaps the internal dynamic pressure generation grooves 81B, which are a part of the internal dynamic pressure generation grooves 81A to 81D, and does not overlap the other internal dynamic pressure generation grooves 81A, 81C, and 81D.

In addition, in the state of FIG. 4C, the sliding surface 7a overlaps the plurality of internal dynamic pressure generation grooves 81A at the part of the sliding surface 8a near 10 o'clock to 2 o'clock. At the part of the sliding surface 8a near 3 o'clock, the sliding surface 7a is disposed on the land 82 between the external dynamic pressure generation groove 80B and the internal dynamic pressure generation groove 81B without overlapping the external dynamic pressure generation groove 80B and the internal dynamic pressure generation groove 81B. At the part of the sliding surface 8a near 4 o'clock to 8 o'clock, the sliding surface 7a overlaps the plurality of external dynamic pressure generation grooves 80C. At the part of the sliding surface 8a near 9 o'clock, the sliding surface 7a is disposed on the land 82 between the external dynamic pressure generation groove 80D and the internal dynamic pressure generation groove 81D without overlapping the external dynamic pressure generation groove 80D and the internal dynamic pressure generation groove 81D.

In other words, in the state of FIG. 4C, the sliding surface 7a overlaps the external dynamic pressure generation grooves 80C, which are a part of the external dynamic pressure generation grooves 80A to 80D, and does not overlap the other external dynamic pressure generation grooves 80A, 80B, and 80D. Further, the sliding surface 7a overlaps the internal dynamic pressure generation grooves 81A, which are a part of the internal dynamic pressure generation grooves 81A to 81D, and does not overlap the other internal dynamic pressure generation grooves 81B to 81D.

In addition, in the state of FIG. 4D, at the part of the sliding surface 8a near 12 o'clock, the sliding surface 7a is disposed on the land 82 between the external dynamic pressure generation groove 80A and the internal dynamic pressure generation groove 81A without overlapping the external dynamic pressure generation groove 80A and the internal dynamic pressure generation groove 81A. At the part of the sliding surface 8a near 1 o'clock to 5 o'clock, the sliding surface 7a overlaps the plurality of external dynamic pressure generation grooves 80B. At the part of the sliding surface 8a near 6 o'clock, the sliding surface 7a is disposed on the land 82 between the external dynamic pressure generation groove 80C and the internal dynamic pressure generation groove 81C without overlapping the external dynamic pressure generation groove 80C and the internal dynamic pressure generation groove 81C. At the part of the sliding surface 8a near 7 o'clock to 11 o'clock, the sliding surface 7a overlaps the plurality of internal dynamic pressure generation grooves 81A.

In other words, in the state of FIG. 4D, the sliding surface 7a overlaps the external dynamic pressure generation grooves 80B, which are a part of the external dynamic pressure generation grooves 80A to 80D, and does not overlap the other external dynamic pressure generation grooves 80A, 80C, and 80D. Further, the sliding surface 7a overlaps the internal dynamic pressure generation grooves 81D, which are a part of the internal dynamic pressure generation grooves 81A to 81D, and does not overlap the other internal dynamic pressure generation grooves 81A to 81C.

In this manner, the positions of the external dynamic pressure generation grooves 80A to 80D and the internal dynamic pressure generation grooves 81A to 81D that the sliding surface 7a overlaps continuously move on the sliding surface 8a in accordance with the eccentric rotation angle of the sliding surface 7a.

Figure 5:
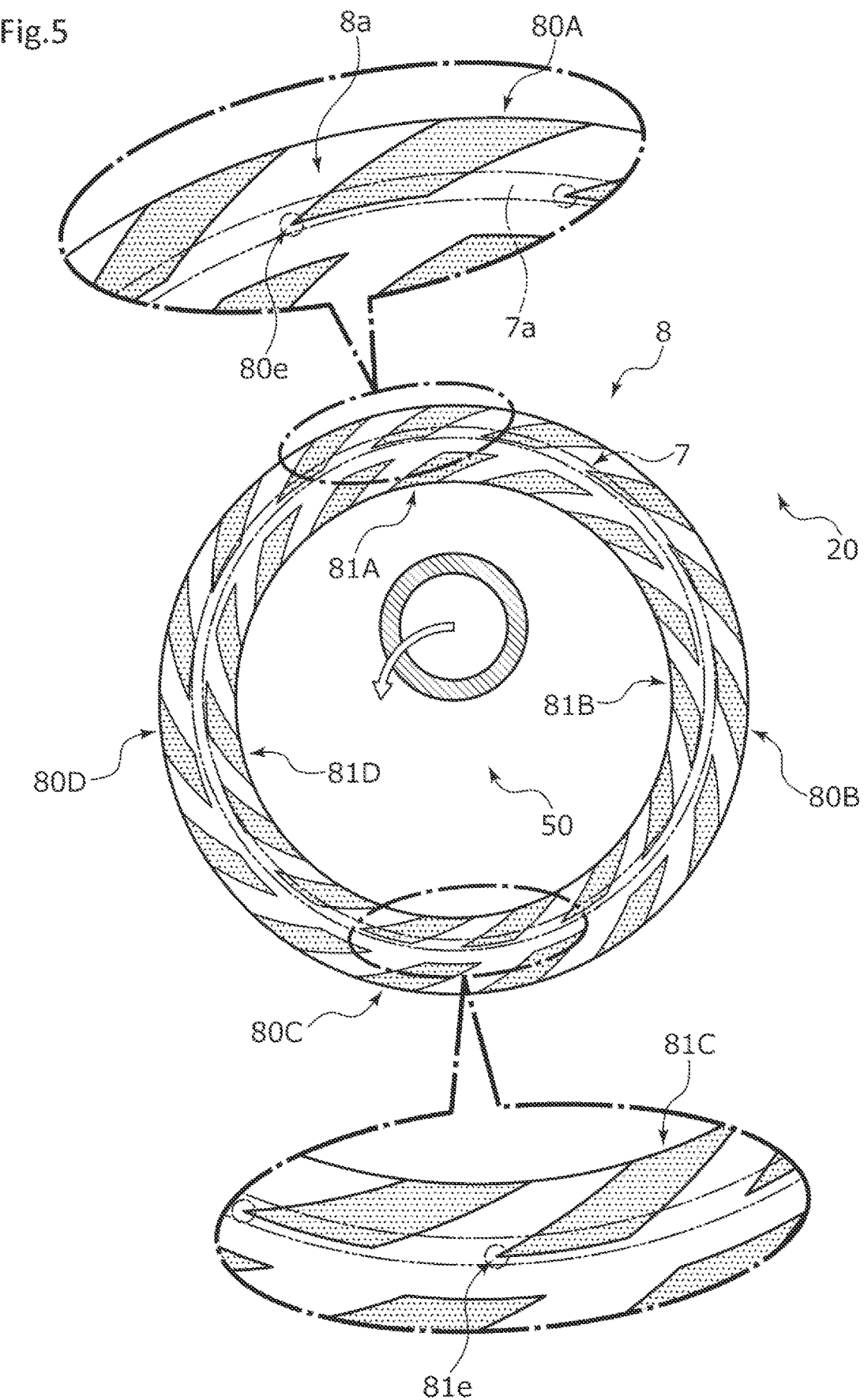
FIG. 5 is a diagram illustrating where the dynamic pressure generated in the dynamic pressure generation groove is generated with respect to the sliding surface of the side seal eccentrically rotating from the state of FIG. 4A toward the state of FIG. 4B.
Figure 6:
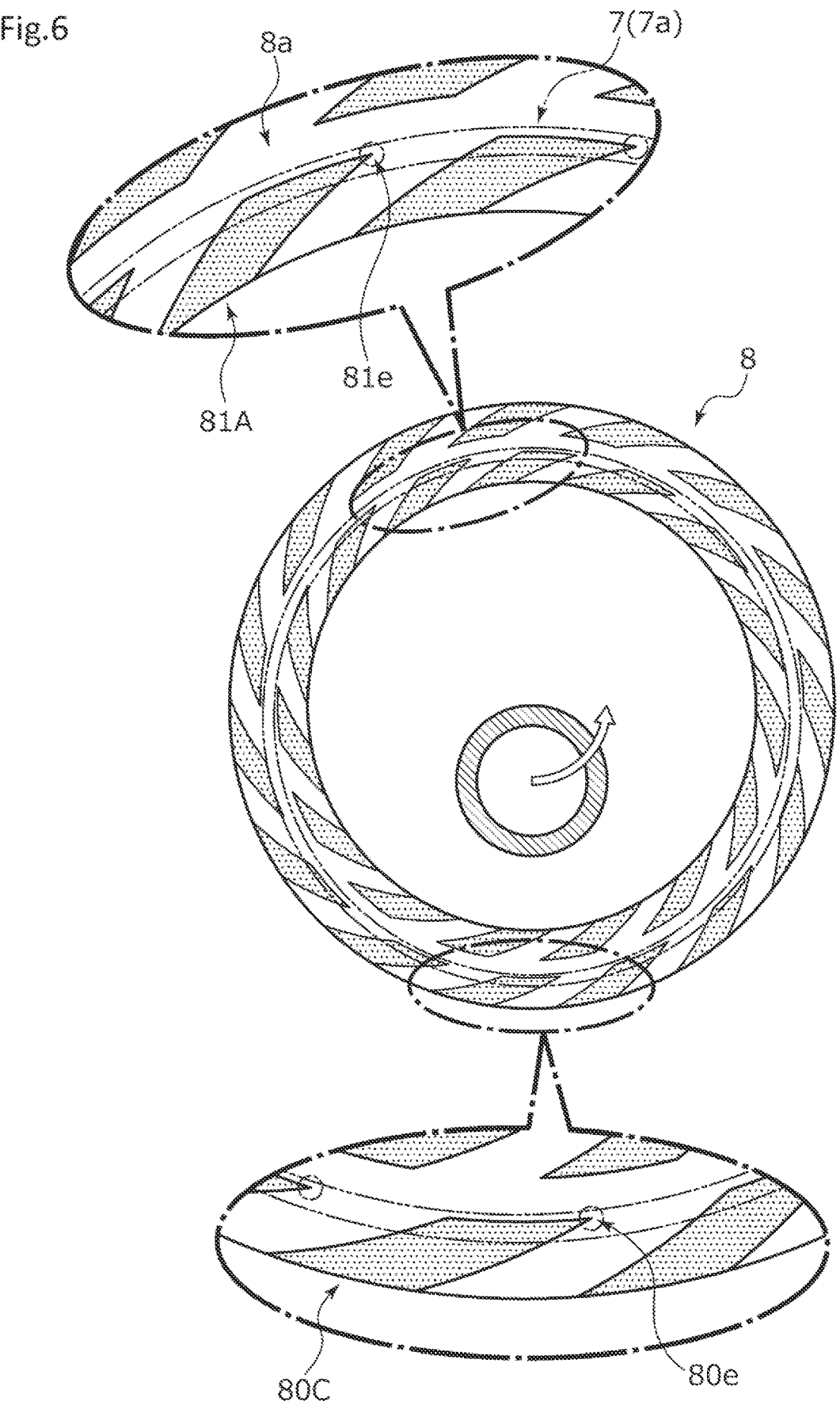
FIG. 6 is a diagram illustrating where the dynamic pressure generated in the dynamic pressure generation groove is generated with respect to the sliding surface of the side seal eccentrically rotating from the state of FIG. 4C toward the state of FIG. 4D.

Next, dynamic pressure generation during relative sliding between the thrust plate 8 and the side seal 7 will be described with reference to FIGS. 5 and 6. It should be noted that FIG. 5 illustrates an aspect when the side seal 7 moves from the state of FIG. 4A toward the state of FIG. 4B and FIG. 6 illustrates an aspect when the side seal 7 moves from the state of FIG. 4C toward the state of FIG. 4D. In addition, in FIGS. 5 and 6, the thrust plate 8 that is viewed from the fixed scroll 41 side is illustrated, and the circle marks illustrated in the enlarged portions indicate the points where the pressure increases in the external dynamic pressure generation groove 80 and the internal dynamic pressure generation groove 81.

As illustrated in FIG. 5, when the side seal 7 moves in the direction of the white arrow, dynamic pressure is generated in the plurality of external dynamic pressure generation grooves 80A and the plurality of internal dynamic pressure generation grooves 81C.

Specifically, when the side seal 7 moves in the direction of the white arrow, the fluid in the external dynamic pressure generation groove 80A moves to follow in the direction of the white arrow, that is, the eccentric rotation direction of the sliding surface 7a, the fluid is collected in the acute-angled corner portion 80e, and a large dynamic pressure is generated in the corner portion 80e. Likewise, in the internal dynamic pressure generation groove 81C, the fluid in the internal dynamic pressure generation groove 81C moves to follow in the direction of the white arrow, the fluid is collected in the acute-angled corner portion 81e, and a large dynamic pressure is generated in the corner portion 81e.

In this manner, the sliding surfaces 7a and 8a can be separated from each other by generating a large dynamic pressure in the corner portion 80e of the external dynamic pressure generation groove 80A and the corner portion 81e of the internal dynamic pressure generation groove 81C. Accordingly, the fluid forms a fluid film between the sliding surfaces 7a and 8a and the frictional resistance between the sliding surfaces 7a and 8a can be reduced.

In addition, when the fluid in the external dynamic pressure generation groove 80A and the internal dynamic pressure generation groove 81C moves to follow in the eccentric rotation direction of the sliding surface 7a, the fluid in the low-pressure chamber 20 is introduced into the external dynamic pressure generation groove 80A through the outer diameter side opening of the external dynamic pressure generation groove 80A and the fluid in the back pressure chamber 50 is introduced into the internal dynamic pressure generation groove 81C through the inner diameter side opening of the internal dynamic pressure generation groove 81C.

In this manner, the fluid can be introduced into the external dynamic pressure generation groove 80A and the internal dynamic pressure generation groove 81C from the low-pressure chamber 20 and the back pressure chamber 50, and thus dynamic pressure can be reliably generated in the external dynamic pressure generation groove 80A and the internal dynamic pressure generation groove 81C.

In addition, the sliding surface 7a overlaps the external dynamic pressure generation grooves 80A, which are a part of the external dynamic pressure generation grooves 80A to 80D, and does not overlap the other external dynamic pressure generation grooves 80B to 80D. Accordingly, unintended dynamic pressure (negative pressure) generation can be prevented in the external dynamic pressure generation grooves 80B to 80D, which the sliding surface 7a does not overlap. In addition, the sliding surface 7a overlaps the internal dynamic pressure generation grooves 81C, which are a part of the internal dynamic pressure generation grooves 81A to 81D, and does not overlap the other internal dynamic pressure generation grooves 81A, 81B, and 81D. Accordingly, unintended dynamic pressure (negative pressure) generation can be prevented in the internal dynamic pressure generation grooves 81A, 81B, and 81D, which the sliding surface 7a does not overlap.

In addition, the corner portion 80e of each external dynamic pressure generation groove 80 and the corner portion 81e of the internal dynamic pressure generation groove 81 face in opposite directions in the circumferential direction. In other words, the corner portion 80e of the external dynamic pressure generation groove 80 and the corner portion 81e of the internal dynamic pressure generation groove 81 adjacent to each other in the radial direction face in opposite directions in the eccentric rotation direction of the sliding surface 7a. Accordingly, in the state of FIG. 5, a large dynamic pressure can be generated in the corner portion 80e of the external dynamic pressure generation groove 80A at the position on the sliding surface 8a near 10 o'clock to 2 o'clock and the corner portion 81e of the internal dynamic pressure generation groove 81C at the position on the sliding surface 8a near 10 o'clock to 2 o'clock, that is, on both radial sides of the sliding surface 8a. Accordingly, the sliding surfaces 7a and 8a can be separated from each other with the inclination of the sliding surfaces 7a and 8a suppressed.

In addition, the back pressure chamber 50 extends to the inner diameter side of the sliding surfaces 7a and 8a. Accordingly, when the sliding surfaces 7a and 8a are separated from each other, the fluid in the back pressure chamber 50 is introduced from the inner diameter side of the sliding surfaces 7a and 8a. In addition, when the scroll compression mechanism 4 is driven, the pressure of the back pressure chamber 50 increases, a high-pressure fluid is introduced between the sliding surfaces 7a and 8a from the back pressure chamber 50, and thus the sliding surfaces 7a and 8a can be further separated from each other by the pressure of the fluid.

In addition, returning to FIG. 3, the radial separation width L5 between each external dynamic pressure generation groove 80 and each internal dynamic pressure generation groove 81 is formed larger than the radial width L6 of the sliding surface 7a of the side seal 7. Accordingly, in a case where the sliding surface 7a overlaps one of the external dynamic pressure generation groove 80 and the internal dynamic pressure generation groove 81 adjacent to each other in the radial direction, the sliding surface 7a does not overlap the other of the external dynamic pressure generation groove 80 and the internal dynamic pressure generation groove 81 adjacent to each other in the radial direction.

For example, as illustrated in the enlarged portion on the upper side of FIG. 5, in a case where the sliding surface 7a overlaps the external dynamic pressure generation groove 80A, the sliding surface 7a does not overlap the internal dynamic pressure generation groove 81A adjacent in the radial direction. In addition, as illustrated in the enlarged portion on the lower side of FIG. 5, in a case where the sliding surface 7a overlaps the internal dynamic pressure generation groove 81A, the sliding surface 7a does not overlap the external dynamic pressure generation groove 80A adjacent in the radial direction.

In other words, the sliding surface 7a is not disposed over the external dynamic pressure generation groove 80A and the internal dynamic pressure generation groove 81A adjacent to each other in the radial direction, and thus simultaneous positive pressure generation in the external dynamic pressure generation groove 80A and negative pressure generation in the internal dynamic pressure generation groove 81A can be prevented and simultaneous negative pressure generation in the external dynamic pressure generation groove 80C and positive pressure generation in the internal dynamic pressure generation groove 81C can be prevented.

In addition, as described above, the positions of the external dynamic pressure generation grooves 80A to 80D and the internal dynamic pressure generation grooves 81A to 81D that the sliding surface 7a overlaps continuously move on the sliding surface 8a in accordance with the eccentric rotation angle of the sliding surface 7a. Accordingly, regardless of the eccentric rotation angle of the sliding surface 7a, the sliding surfaces 7a and 8a can be separated from each other with the inclination of the sliding surfaces 7a and 8a suppressed over the entire circumference of the sliding surface 8a.

For example, in the state of FIG. 6, when the side seal 7 moves in the direction of the white arrow, a large dynamic pressure is generated in the corner portion 80e of the external dynamic pressure generation groove 80C and the corner portion 81e of the internal dynamic pressure generation groove 81A and the sliding surfaces 7a and 8a can be separated from each other with the inclination of the sliding surfaces 7a and 8a suppressed.

It should be noted that FIG. 5 illustrates a form when the side seal 7 moves from the state of FIG. 4A toward the state of FIG. 4B, FIG. 6 illustrates a form when the side seal 7 moves from the state of FIG. 4C toward the state of FIG. 4D, dynamic pressure is generated in substantially the same form when the side seal 7 moves from the state of FIG. 4A toward the state of FIG. 4B, when the side seal 7 moves from the state of FIG. 4C toward the state of FIG. 4D, when the side seal 7 moves from the state of FIG. 4B toward the state of FIG. 4C, and when the side seal 7 moves from the state of FIG. 4D toward the state of FIG. 4A, and thus description is omitted as to the forms when the side seal 7 moves from the state of FIG. 4B toward the state of FIG. 4C and from the state of FIG. 4D toward the state of FIG. 4A.

Second Embodiment

Next, a sliding surface 108a of a thrust plate 108 as a sliding component according to a second embodiment of the present invention will be described with reference to FIG. 7. It should be noted that the description of configurations identical to those of the first embodiment will be omitted for redundancy avoidance.

Figure 7:
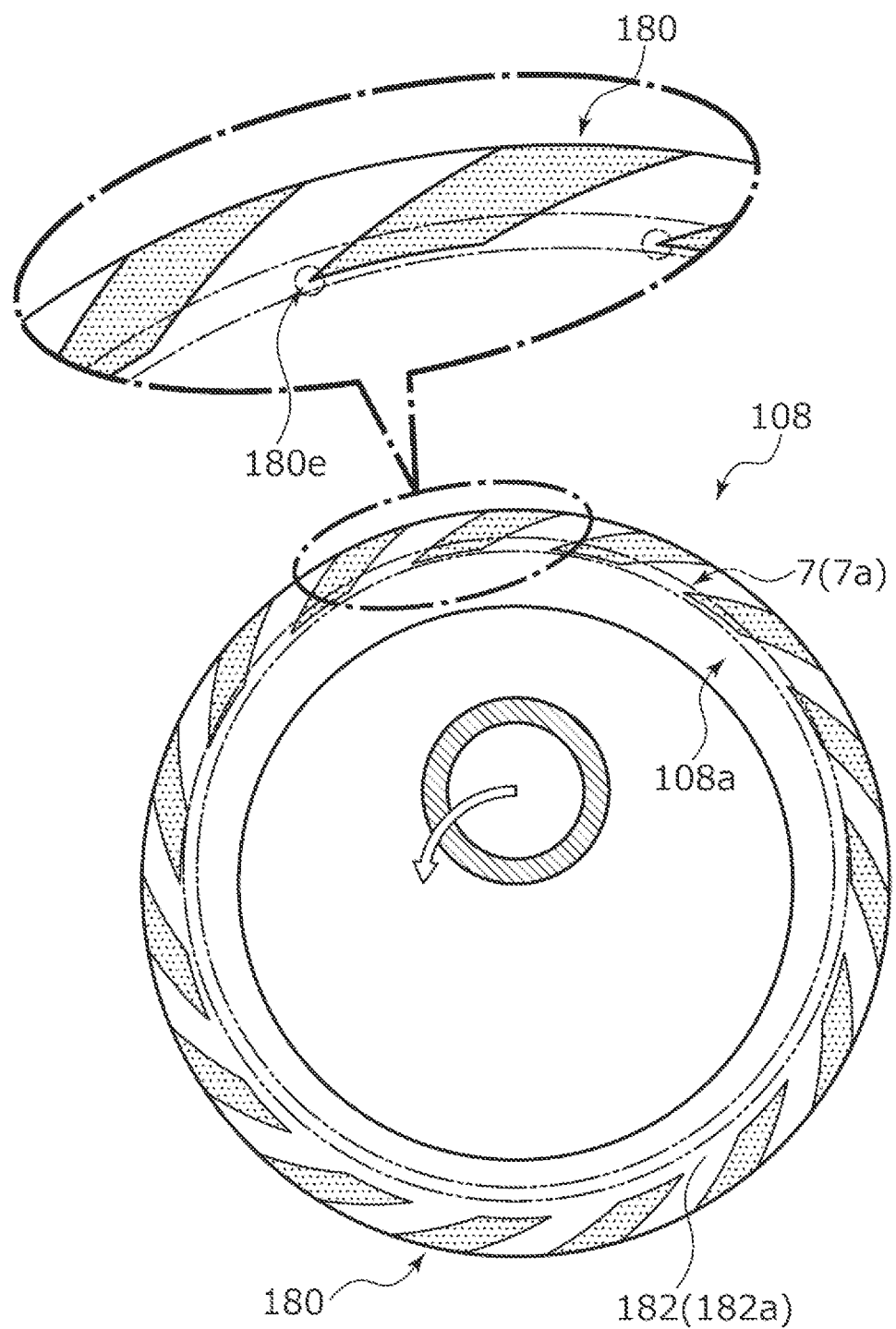
FIG. 7 is a diagram illustrating a sliding surface of a thrust plate as a sliding component according to a second embodiment of the present invention.

As illustrated in FIG. 7, a plurality of external dynamic pressure generation grooves 180 are provided in the circumferential direction in the sliding surface 108a of the thrust plate 108. The external dynamic pressure generation groove 180 communicates with the external space on the outer diameter side (that is, the low-pressure chamber 20 (see FIG. 1)). In other words, the sliding surface 108a is not provided with the internal dynamic pressure generation groove 81 as in the first embodiment, and the inner diameter side of the sliding surface 108a is formed on a flat surface by a surface 182a of a land 182.

FIG. 7 illustrates a state where the side seal 7 is disposed close to 12 o'clock from a position concentric with the thrust plate 108 (see FIG. 4A).

In this state, the sliding surface 7a overlaps the plurality of external dynamic pressure generation grooves 180 near 10 o'clock to 2 o'clock on the sliding surface 108a (that is, some dynamic pressure generation grooves). The sliding surface 7a does not overlap the plurality of external dynamic pressure generation grooves 180 near 3 o'clock to 9 o'clock on the sliding surface 108a (that is, the other dynamic pressure generation grooves).

According to this, when the side seal 7 moves in the direction of the white arrow, a large dynamic pressure is generated in an acute-angled corner portion 180e of each external dynamic pressure generation groove 180 near 10 o'clock to 2 o'clock on the sliding surface 108a and no dynamic pressure is generated at the part of the sliding surface 108a near 3 o'clock to 9 o'clock.

In this manner, dynamic pressure can be generated only in the external dynamic pressure generation grooves 180 that the sliding surface 7a of the side seal 7 overlaps, and thus unintended negative pressure generation can be prevented in the other external dynamic pressure generation grooves 180, which the sliding surface 7a does not overlap.

It should be noted that although the present second embodiment exemplifies a form in which the plurality of external dynamic pressure generation grooves 180 are provided in the circumferential direction and no internal dynamic pressure generation groove is provided, a plurality of internal dynamic pressure generation grooves may be provided in the circumferential direction and no external dynamic pressure generation groove may be provided in an alternative form.

Third Embodiment

Next, a sliding surface 208a of a thrust plate 208 as a sliding component according to a third embodiment of the present invention will be described with reference to FIG. 8. It should be noted that the description of configurations identical to those of the first embodiment will be omitted for redundancy avoidance.

Figure 8:
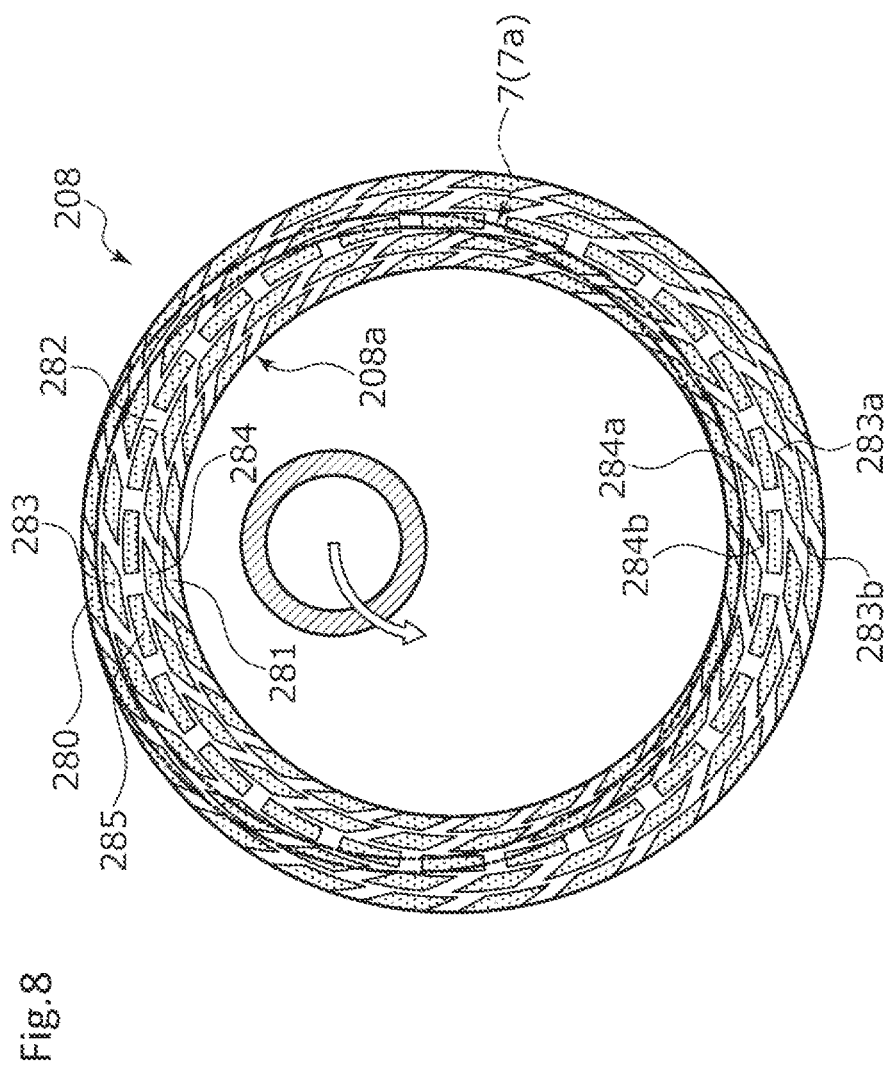
FIG. 8 is a diagram illustrating a sliding surface of a thrust plate as a sliding component according to a third embodiment of the present invention.

As illustrated in FIG. 8, between each external dynamic pressure generation groove 280 and each internal dynamic pressure generation groove 281 in the sliding surface 208a of the thrust plate 208, a plurality of (three in the present third embodiment) non-communication grooves surrounded by a land 282 are provided side by side in the radial direction.

Specifically, the sliding surface 208a of the thrust plate 208 has a first non-communication groove 283 adjacent to the inner diameter side of the external dynamic pressure generation groove 280, a second non-communication groove 284 adjacent to the outer diameter side of the internal dynamic pressure generation groove 281, and a third non-communication groove 285 disposed between the first non-communication groove 283 and the second non-communication groove 284. The external dynamic pressure generation groove 280, the internal dynamic pressure generation groove 281, the first non-communication groove 283, the second non-communication groove 284, and the third non-communication groove 285 of the present third embodiment are wider in the circumferential direction than in the radial direction.

The first non-communication groove 283 has a substantially parallelogram shape when viewed from the axial direction, and acute-angled corner portions 283a and 283b are formed toward the counterclockwise inner diameter side and the clockwise outer diameter side. The second non-communication groove 284 has a substantially parallelogram shape when viewed from the axial direction, and acute-angled corner portions 284a and 284b are formed toward the counterclockwise inner diameter side and the clockwise outer diameter side. The third non-communication groove 285 has a substantially rectangular shape having a long side in the circumferential direction when viewed from the axial direction.

The external dynamic pressure generation groove 280, the internal dynamic pressure generation groove 281, the first non-communication groove 283, and the second non-communication groove 284 are disposed on a virtual line (not illustrated) radially extending from the center point of the thrust plate 208. In addition, the third non-communication groove 285 is disposed so as to slightly deviate in the circumferential direction from the external dynamic pressure generation groove 280, the internal dynamic pressure generation groove 281, the first non-communication groove 283, and the second non-communication groove 284 arranged in the radial direction.

FIG. 8 illustrates a state where the side seal 7 is disposed close to 12 o'clock from a position concentric with the thrust plate 208 (see FIG. 4A).

In this state, the sliding surface 7a overlaps the plurality of external dynamic pressure generation grooves 280 at the part of the sliding surface 208a near 11 o'clock to 1 o'clock. At the part of the sliding surface 208a near 2 o'clock to 4 o'clock, the sliding surface 7a overlaps the plurality of first non-communication grooves 283, second non-communication grooves 284, and third non-communication grooves 285. At the part of the sliding surface 208a near 5 o'clock to 7 o'clock, the sliding surface 7a overlaps the plurality of internal dynamic pressure generation grooves 281. At the part of the sliding surface 208a near 8 o'clock to 10 o'clock, the sliding surface 7a overlaps the plurality of first non-communication grooves 283, second non-communication grooves 284, and third non-communication grooves 285.

When the side seal 7 moves in the direction of the white arrow from the state of FIG. 8, dynamic pressure is generated mainly at the part of the sliding surface 208a near 11 o'clock to 1 o'clock and the part of the sliding surface 208a near 5 o'clock to 7 o'clock by the plurality of external dynamic pressure generation grooves 280 and the plurality of internal dynamic pressure generation grooves 281. In addition, dynamic pressure can be generated at the part of the sliding surface 208a near 2 o'clock to 4 o'clock and the part of the sliding surface 208a near 8 o'clock to 10 o'clock by the plurality of first non-communication grooves 283, second non-communication grooves 284, and third non-communication grooves 285. Accordingly, the sliding surface 7a and the sliding surface 208a can be separated from each other with the inclination of the sliding surface 7a and the sliding surface 208a suppressed.

In addition, the side seal 7 overlaps any of the external dynamic pressure generation groove 280, the internal dynamic pressure generation groove 281, the first non-communication groove 283, the second non-communication groove 284, and the third non-communication groove 285 over the circumferential direction of the sliding surface 208a. Accordingly, dynamic pressure can be generated over the circumferential direction regardless of the relative positions of the side seal 7 and the sliding surface 208a.

In addition, the first non-communication groove 283, the second non-communication groove 284, and the third non-communication groove 285 are in a state of non-communication with the external space. Accordingly, in sliding with the side seal 7, no fluid flows out from each non-communication groove to the external space and dynamic pressure can be reliably generated. Further, a large dynamic pressure can be generated by the corner portions 283a and 283b and the corner portions 284a and 284b.

In addition, the first non-communication groove 283, the second non-communication groove 284, and the third non-communication groove 285 have different shapes, and thus the dynamic pressure can be changed in accordance with the relative positions of the side seal 7 and the sliding surface 208a. In other words, it is easy to design such that the sliding surface 7a and the sliding surface 208a are appropriately separated from each other with respect to the eccentric rotation motion of the side seal 7.

Fourth Embodiment

Next, a sliding surface 308a of a thrust plate 308 as a sliding component according to a fourth embodiment of the present invention will be described with reference to FIG. 9.

It should be noted that the description of configurations identical to those of the first embodiment will be omitted for redundancy avoidance.

Figure 9:
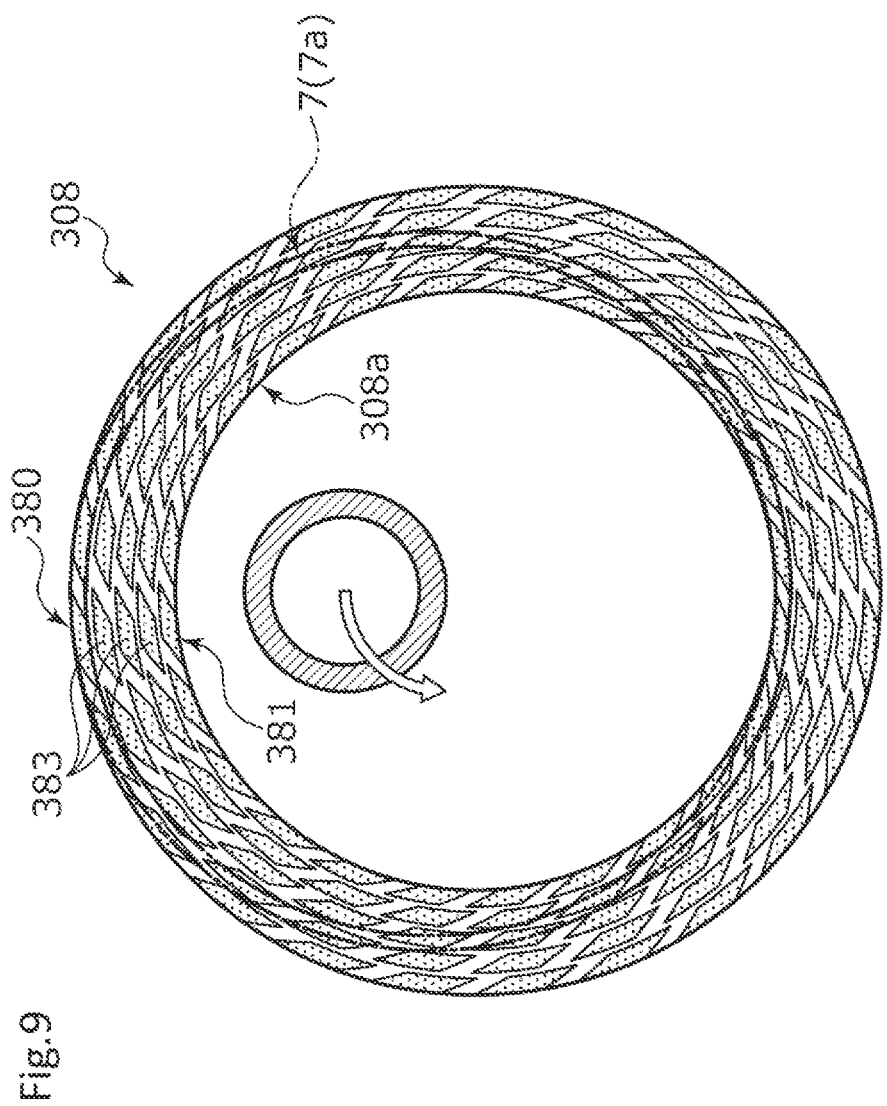
FIG. 9 is a diagram illustrating a sliding surface of a thrust plate as a sliding component according to a fourth embodiment of the present invention.

As illustrated in FIG. 9, between each external dynamic pressure generation groove 380 and each internal dynamic pressure generation groove 381 in the sliding surface 308a of the thrust plate 308, a plurality of (three in the present fourth embodiment) non-communication grooves 383 are provided side by side in the radial direction.

These non-communication grooves 383 have identical and substantially parallelogram shapes when viewed from the axial direction. The external dynamic pressure generation groove 380, the internal dynamic pressure generation groove 381, and each non-communication groove 383 are arranged side by side in the radial direction.

The side seal 7 overlaps any of the external dynamic pressure generation groove 380, the internal dynamic pressure generation groove 381, and the non-communication groove 383 over the circumferential direction of the sliding surface 308a. Accordingly, dynamic pressure can be generated over the circumferential direction regardless of the relative positions of the side seal 7 and the sliding surface 308a.

Fifth Embodiment

Next, a sliding surface 408a of a thrust plate 408 as a sliding component according to a fifth embodiment of the present invention will be described with reference to FIG. 10. It should be noted that the description of configurations identical to those of the first embodiment will be omitted for redundancy avoidance.

Figure 10:
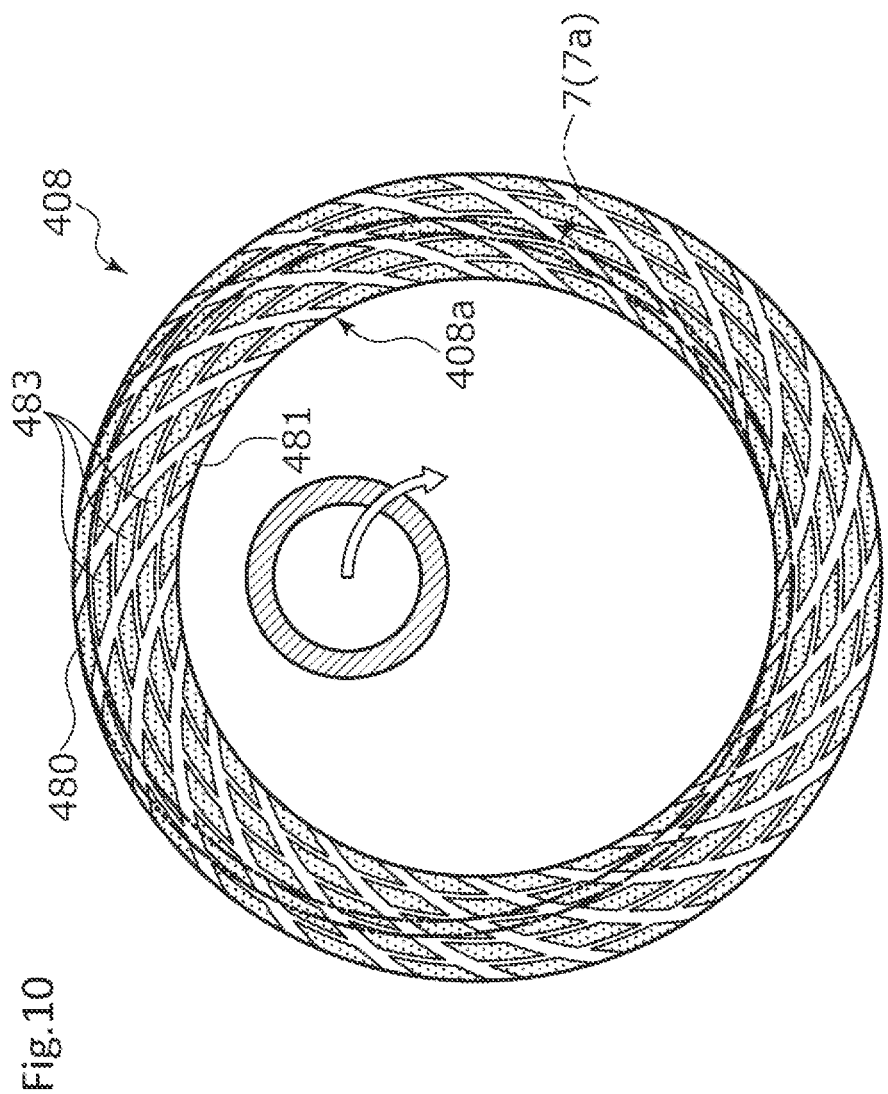
FIG. 10 is a diagram illustrating a sliding surface of a thrust plate as a sliding component according to a fifth embodiment of the present invention.

As illustrated in FIG. 10, between each external dynamic pressure generation groove 480 and each internal dynamic pressure generation groove 481 in the sliding surface 408a of the thrust plate 408, a plurality of (three in the present fifth embodiment) non-communication grooves 483 are provided side by side. The external dynamic pressure generation groove 480, the internal dynamic pressure generation groove 481, and each non-communication groove 483 are inverted in shape from the various grooves of the second and third embodiments.

The single row of the external dynamic pressure generation groove 480, the internal dynamic pressure generation groove 481, and each non-communication groove 483 arranged in the radial direction is disposed along the eccentric rotation direction of the side seal 7 from the external dynamic pressure generation groove 480 toward the internal dynamic pressure generation groove 481. In other words, the external dynamic pressure generation groove 480, the internal dynamic pressure generation groove 481, and each non-communication groove 483 arranged in the radial direction are disposed so as to be inclined in the circumferential direction. In other words, in this disposition, the dimensions between the circumferential directions of the grooves are constant and the grooves are inclined and continuous in the circumferential directions. It should be noted that the dimension between the circumferential directions is not limited to being constant and may be increased or decreased at a predetermined rate toward the outer diameter.

In this manner, the external dynamic pressure generation groove 480, the internal dynamic pressure generation groove 481, and each non-communication groove 483 are formed by inversion from the second and third embodiments. As a result, dynamic pressure corresponding to the eccentric rotation direction of the side seal 7 that is opposite to those of the second and third embodiments can be generated.

Sixth Embodiment

Next, a sliding surface 508a of a thrust plate 508 as a sliding component according to a sixth embodiment will be described with reference to FIG. 11. It should be noted that the description of configurations identical to those of the first embodiment will be omitted for redundancy avoidance.

Figure 11:
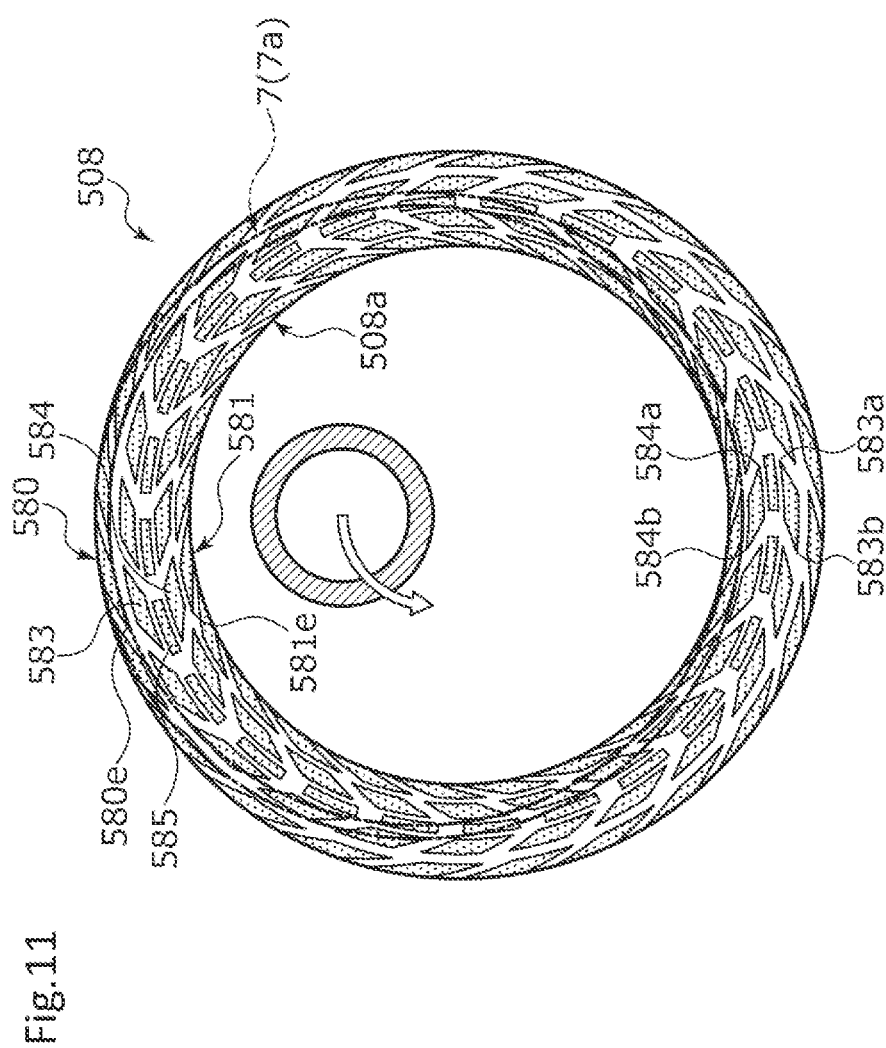
FIG. 11 is a diagram illustrating a sliding surface of a thrust plate as a sliding component according to a sixth embodiment of the present invention.

As illustrated in FIG. 11, a plurality of external dynamic pressure generation grooves 580 and internal dynamic pressure generation grooves 581 are formed in the circumferential direction in the sliding surface 508a of the thrust plate 508. In the external dynamic pressure generation groove 580, a corner portion 580e having an acute angle is formed at the inner diameter end in the counterclockwise direction. In the internal dynamic pressure generation groove 581, a corner portion 581e having an acute angle is formed at the outer diameter end in the counterclockwise direction. The external dynamic pressure generation groove 580 communicates with the external space on the outer diameter side (that is, the low-pressure chamber 20 (see FIG. 1)). The internal dynamic pressure generation groove 581 communicates with the external space on the inner diameter side (that is, the back pressure chamber 50 (see FIG. 1)).

In addition, a first non-communication groove 583, a second non-communication groove 584, and a third non-communication groove 585 are formed between the external dynamic pressure generation groove 580 and the internal dynamic pressure generation groove 581 that are radially adjacent to each other in the sliding surface 508a.

The first non-communication groove 583 adjacent to the inner diameter side of the external dynamic pressure generation groove 580 has a substantially parallelogram shape having acute-angled corner portions 583a and 583b on the inner diameter side in the counterclockwise direction and the outer diameter side in the clockwise direction.

In addition, the second non-communication groove 584 adjacent to the outer diameter side of the internal dynamic pressure generation groove 581 has a substantially parallelogram shape having acute-angled corner portions 584a and 584b on the outer diameter side in the counterclockwise direction and the inner diameter side in the clockwise direction. It should be noted that the third non-communication groove 585 has a substantially rectangular shape having a long side in the circumferential direction when viewed from the axial direction.

In addition, the first non-communication groove 583 deviates in the clockwise direction from the third non-communication groove 585 and is disposed on the outer diameter side thereof, and the external dynamic pressure generation groove 580 deviates in the clockwise direction from the first non-communication groove 583 and is disposed on the outer diameter side thereof. In other words, in this disposition, the center lines between the circumferential directions of the grooves deviate in the circumferential direction, that is, the center lines between the grooves adjacent in the radial direction are not continuous.

In addition, the second non-communication groove 584 deviates in the clockwise direction from the third non-communication groove 585 and is disposed on the inner diameter side thereof, and the external dynamic pressure generation groove 580 deviates in the clockwise direction from the first non-communication groove 583 and is disposed on the inner diameter side thereof. In other words, in this disposition, the center lines between the circumferential directions of the grooves deviate in the circumferential direction, that is, the center lines between the grooves adjacent in the radial direction are not continuous.

In the state of FIG. 11, the sliding surface 7a overlaps the plurality of external dynamic pressure generation grooves 580 at the part of the sliding surface 508a near 11 o'clock to 1 o'clock. At the part of the sliding surface 508a near 2 o'clock to 4 o'clock, the sliding surface 7a overlaps the plurality of first non-communication grooves 583, second non-communication grooves 584, and third non-communication grooves 585. At the part of the sliding surface 508a near 5 o'clock to 7 o'clock, the sliding surface 7a overlaps the plurality of internal dynamic pressure generation grooves 581. At the part of the sliding surface 508a near 8 o'clock to 10 o'clock, the sliding surface 7a overlaps the plurality of first non-communication grooves 583, second non-communication grooves 584, and third non-communication grooves 585.

When the side seal 7 moves in the direction of the white arrow from the state of FIG. 11, dynamic pressure is generated at the part of the sliding surface 508a near 8 o'clock to 4 o'clock by plurality of external dynamic pressure generation grooves 580 and the plurality of first non-communication grooves 583, second non-communication grooves 584, and third non-communication grooves 585.

Meanwhile, at the part of the sliding surface 508a near 7 o'clock, almost no dynamic pressure is generated by the plurality of internal dynamic pressure generation grooves 581 and a negative pressure is generated at the part of the sliding surface 508a near 5 o'clock to 6 o'clock.

In this manner, dynamic pressure can be generated on most of the sliding surface 508a in the circumferential direction to improve the lubricity between the sliding surfaces 7a and 508a. In addition, by generating a negative pressure at a part of the sliding surface 508a in the circumferential direction and bringing the sliding surfaces 7a and 508a close to each other, a state where the sliding surfaces 7a and 508a slide relative to each other can be maintained.

Seventh Embodiment

Next, a sliding surface 608a of a thrust plate 608 as a sliding component according to a seventh embodiment will be described with reference to FIG. 12. It should be noted that the description of configurations identical to those of the first embodiment will be omitted for redundancy avoidance.

Figure 12:
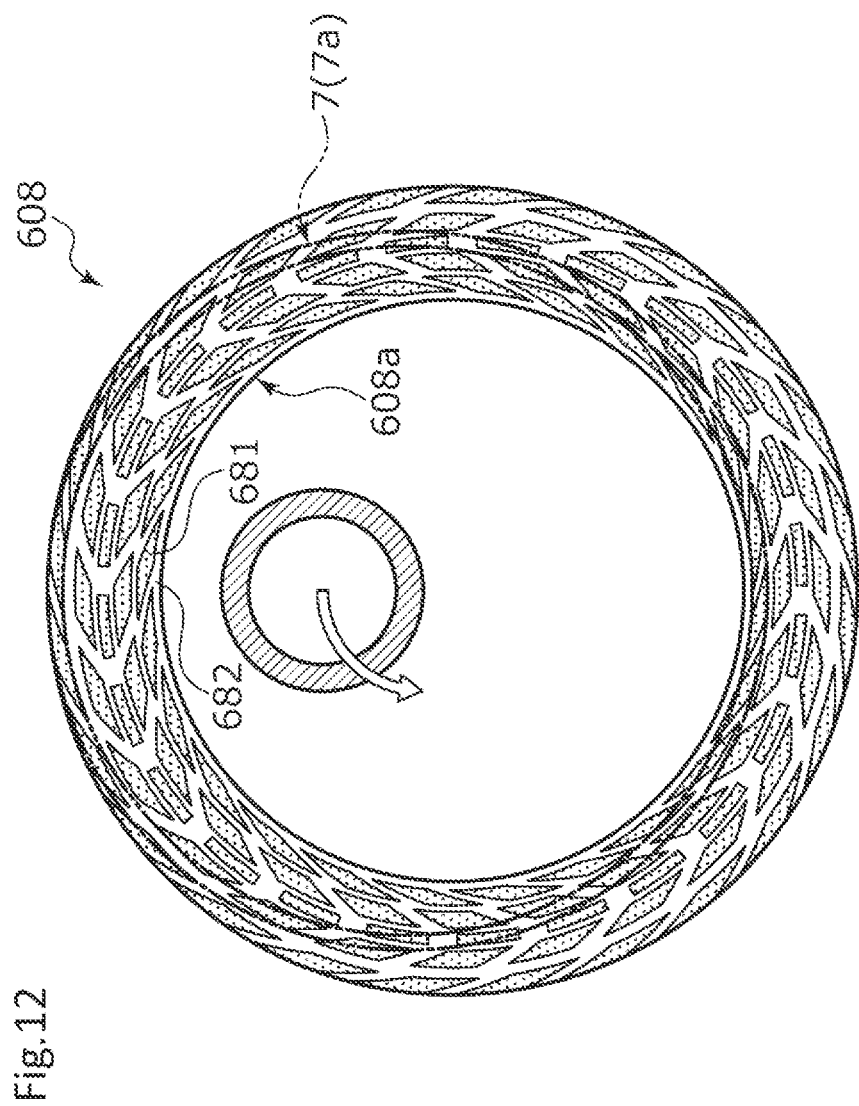
FIG. 12 is a diagram illustrating a sliding surface of a thrust plate as a sliding component according to a seventh embodiment of the present invention.

As illustrated in FIG. 12, an internal dynamic pressure generation groove 681 of the sliding surface 608a of the thrust plate 608 is partitioned by a land 682 in a state of non-communication with the external space on the inner diameter side (that is, the back pressure chamber 50 (see FIG. 1)). It should be noted that the other shapes are the same as those in the sixth embodiment.

According to this, dynamic pressure can be generated over the circumferential direction of the sliding surface 608a, and thus the sliding surfaces 7a and 608a can be separated from each other in a state where the relative inclination of the sliding surfaces 7a and 608a is small.

Eighth Embodiment

Next, a sliding surface 708a of a thrust plate 708 as a sliding component according to an eighth embodiment will be described with reference to FIG. 13. It should be noted that the description of configurations identical to those of the first embodiment will be omitted for redundancy avoidance.

Figure 13:
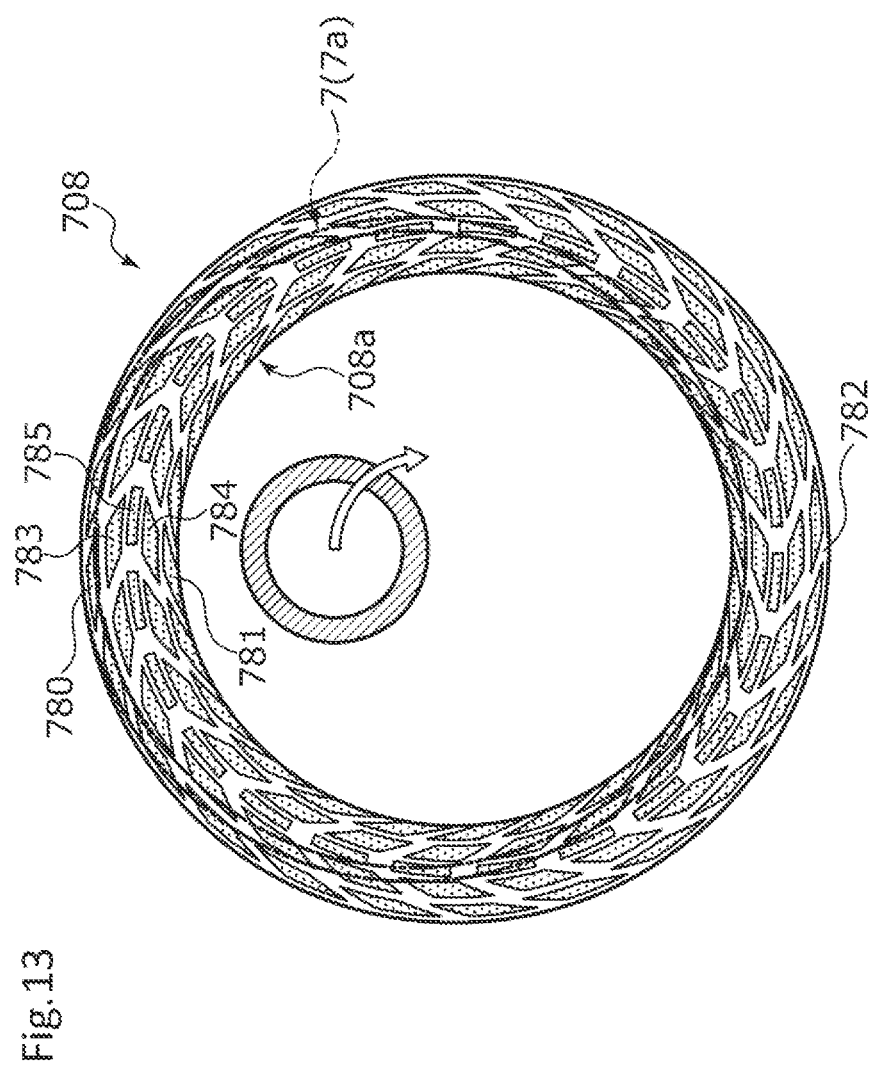
FIG. 13 is a diagram illustrating a sliding surface of a thrust plate as a sliding component according to an eighth embodiment of the present invention.

As illustrated in FIG. 13, each external dynamic pressure generation groove 780 in the sliding surface 708a of the thrust plate 708 is partitioned by a land 782 in a state of non-communication with the external space on the outer diameter side (that is, the low-pressure chamber 20 (see FIG. 1)). In addition, each internal dynamic pressure generation groove 781 communicates with the external space on the inner diameter side (that is, the back pressure chamber 50 (see FIG. 1)).

In addition, a first non-communication groove 783, a second non-communication groove 784, and a third non-communication groove 785 are disposed between each external dynamic pressure generation groove 780 and each internal dynamic pressure generation groove 781. The external dynamic pressure generation groove 780, the internal dynamic pressure generation groove 781, the first non-communication groove 783, the second non-communication groove 784, and the third non-communication groove 785 are inverted in shape from the various grooves of the sixth and seventh embodiments.

In this manner, the external dynamic pressure generation groove 780, the internal dynamic pressure generation groove 781, the first non-communication groove 783, the second non-communication groove 784, and the third non-communication groove 785 are formed by inversion from the sixth and seventh embodiments. As a result, dynamic pressure corresponding to the eccentric rotation direction of the side seal 7 that is opposite to those of the sixth and seventh embodiments can be generated.

In addition, the external dynamic pressure generation groove 780 is partitioned by the land 782 in a state of non-communication with the external space on the outer diameter side, and thus dynamic pressure can be reliably generated during sliding relative to the side seal 7.

In addition, in a case where the side seal 7 is eccentrically rotated in the direction opposite to that of FIG. 13, that is, counterclockwise, dynamic pressure can be generated over the circumferential direction of the sliding surface 708a, and thus the sliding surfaces 7a and 708a can be separated from each other in a state where the relative inclination of the sliding surfaces 7a and 708a is small.

Although the embodiments of the present invention have been described above with reference to the drawings, the specific configurations are not limited to the embodiments and any changes or additions within the scope of the present invention are included in the present invention.

Although an aspect in which the side seal 7 as a sliding component is applied to the scroll compressor C used in the air conditioning system of an automobile or the like has been described in the first to eighth embodiments, the present invention is not limited thereto and the side seal 7 as a sliding component may be applied to, for example, a scroll expansion compressor provided integrally with an expander and a compressor insofar as it is a rotating machine including an eccentric mechanism.

In addition, each of the fluids in the spaces inside and outside the sliding surface of the sliding component may be any of a gas, a liquid, and a gas-liquid mixture.

In addition, insofar as the sliding component of the present invention has a sliding surface that relatively slides with eccentric rotation, the sliding component of the present invention may be used in an environment in which the pressure inside the sliding surface and the pressure outside the sliding surface are equal to each other without being limited to an environment in which there is a pressure difference between the inside and outside of the sliding surface. In addition, the sliding component of the present invention does not have to function as a seal and may be one capable of stably reducing the frictional resistance of a sliding surface.

In addition, although the side seal having the relatively sliding surface is made of resin and the thrust plate is made of metal in the first to eighth embodiments, the material of the sliding component may be freely selected in accordance with the environment of use and so on.

In addition, although an aspect in which a dynamic pressure generation groove is formed in the sliding region (see FIG. 4) of the sliding surface of the thrust plate has been described in the first to eighth embodiments, the present invention is not limited thereto. A dynamic pressure generation groove may be formed in the sliding surface of the side seal, which is a sliding component having a sliding surface relatively sliding with eccentric rotation. In addition, dynamic pressure generation grooves may be formed in both the sliding surface of the side seal and the sliding surface of the thrust plate.

In addition, although a configuration in which the sliding surface of the side seal and the sliding surface of the thrust plate as a sliding component slide relative to each other with eccentric rotation has been described in the first to eighth embodiments, the present invention is not limited thereto. A dynamic pressure generation groove may be formed in the sliding surface relatively sliding with eccentric rotation with only one of the side seal and the thrust plate provided. For example, in a case where only the thrust plate is provided, dynamic pressure generation grooves may be formed in one or both of the sliding surface of the thrust plate as a sliding component and the back surface of the end plate of the movable scroll. In addition, in a case where only the side seal is provided, a dynamic pressure generation groove may be formed in the sliding surface of the side seal as a sliding component. In this case, the side seal also functions as a thrust bearing that abuts against the inner peripheral surface of the inner casing and receives the axial load of the movable scroll.

In addition, in a case where the side seal and the thrust plate are not provided and the back surface of the end plate of the movable scroll functions as a thrust bearing that abuts against the inner peripheral surface of the inner casing and receives the axial load of the movable scroll, a dynamic pressure generation groove may be formed in the sliding surface formed on the back surface of the end plate of the movable scroll or the inner casing.

In addition, although a form in which the external space on the low-pressure side is on the outer diameter side of the side seal and the high-pressure external space is on the inner diameter side of the side seal has been exemplified, the external space on the low-pressure side may be on the inner diameter side of the side seal with the high-pressure external space on the outer diameter side of the side seal.

In addition, although acute-angled corner portions have been exemplified as the tapered portions of the external and internal dynamic pressure generation grooves in the first to eighth embodiments, the present invention is not limited thereto. The dynamic pressure generation groove may be tapered toward the eccentric rotation direction and the tip thereof may form a surface orthogonal to the eccentric rotation direction or a curved surface shape.

Although the first to eighth embodiments exemplify a form in which the facing sliding surface slides relative to the sliding surface so as not to overlap the other external dynamic pressure generation grooves and the other internal dynamic pressure generation grooves when the facing sliding surface overlaps one of the external dynamic pressure generation grooves and one of the internal dynamic pressure generation grooves, the facing sliding surface may be relatively slid so as to always overlap each external dynamic pressure generation groove and each internal dynamic pressure generation groove.

It should be noted that although the first to eighth embodiments exemplify a form in which the side walls of the external and internal dynamic pressure generation grooves are curved, the walls may be formed linearly.

In addition, the numbers of the external and internal dynamic pressure generation grooves can be freely changed without being limited to the forms of the first to eighth embodiments. In addition, although the first and third to eighth embodiments exemplify a form in which the external and internal dynamic pressure generation grooves are equal in number, the present invention is not limited thereto and the grooves may be different in number.

According to the description of the first and third to eighth embodiments, the external dynamic pressure generation groove is a dynamic pressure generation groove and the internal dynamic pressure generation groove is another dynamic pressure generation groove. Alternatively, the external dynamic pressure generation groove may be another dynamic pressure generation groove and the internal dynamic pressure generation groove may be a dynamic pressure generation groove.

REFERENCE SIGNS LIST

4 Scroll compression mechanism
7 Side seal
7a Sliding surface (facing sliding surface)
8 Thrust plate (sliding component)
8a Sliding surface
20 Low-pressure chamber (external space on outer diameter side)
41 Fixed scroll
42 Movable scroll
50 Back pressure chamber (external space on inner diameter side)
80, 80A to 80B External dynamic pressure generation groove (dynamic pressure generation groove)
80e Corner portion
81, 81A to 81B Internal dynamic pressure generation groove (another dynamic pressure generation groove)
81e Corner portion
82 Land
108 Thrust plate (sliding component)
108a Sliding surface
180 External dynamic pressure generation groove (dynamic pressure generation groove)
180e Corner portion
208 Thrust plate (sliding component)
208a Sliding surface
280 External dynamic pressure generation groove (dynamic pressure generation groove)
281 Internal dynamic pressure generation groove (another dynamic pressure generation groove)
283 First non-communication groove
284 Second non-communication groove
285 Third non-communication groove
308 Thrust plate (sliding component)
308a Sliding surface
380 External dynamic pressure generation groove (dynamic pressure generation groove)
381 Internal dynamic pressure generation groove (another dynamic pressure generation groove)

383 Non-communication groove
408 Thrust plate (sliding component)
408a Sliding surface
480 External dynamic pressure generation groove (dynamic pressure generation groove)
481 Internal dynamic pressure generation groove (another dynamic pressure generation groove)
483 Non-communication groove
508 Thrust plate (sliding component)
508a Sliding surface
580 External dynamic pressure generation groove (dynamic pressure generation groove)
580e Corner portion
581 Internal dynamic pressure generation groove (another dynamic pressure generation groove)
581e Corner portion
583 First non-communication groove
584 Second non-communication groove
585 Third non-communication groove
608 Thrust plate (sliding component)
608a Sliding surface
681 Internal dynamic pressure generation groove (another dynamic pressure generation groove)
682 Land
708 Thrust plate (sliding component)
708a Sliding surface
780 External dynamic pressure generation groove (dynamic pressure generation groove)
781 Internal dynamic pressure generation groove (another dynamic pressure generation groove)
783 First non-communication groove
784 Second non-communication groove
785 Third non-communication groove
C Scroll compressor
M Drive motor

The invention claimed is:

1. A sliding component comprising:
a sliding surface sliding relatively to a facing sliding surface with eccentric rotation, wherein the sliding surface is provided with a plurality of dynamic pressure generation grooves arranged in a circumferential direction and each having, in a plan view, a tapered portion configured to become narrower toward a downstream side in an eccentric rotation direction of the facing sliding surface relatively to the sliding surface; and
wherein an end portion of each of the dynamic pressure generation grooves on the downstream side in the eccentric rotation direction is an acute-angled corner portion.

2. The sliding component according to claim 1, wherein each of the dynamic pressure generation grooves communicates with an external space on an inner diameter side or an outer diameter side of the sliding surface.

3. The sliding component according to claim 1, wherein the sliding surface and the facing sliding surface slide relative to each other with eccentric rotation such that the facing sliding surface overlaps with part of the plurality of dynamic pressure generation grooves and the facing sliding surface does not overlap with remains of the dynamic pressure generation grooves at any moment.

4. The sliding component according to claim 1, wherein the dynamic pressure generation grooves are arranged in the circumferential direction on one of an inner diameter side and an outer diameter side of the sliding surface, and
the sliding surface is further provided with a plurality of other dynamic pressure generation grooves arranged in the circumferential direction on remaining one of the inner diameter side and the outer diameter side of the sliding surface and each having, in a plan view, a tapered portion configured to become narrower toward the upstream side in the eccentric rotation direction of the facing sliding surface relatively to the sliding surface.

5. The sliding component according to claim 4, wherein adjacent two of the tapered portions of the dynamic pressure generation grooves and the other dynamic pressure generation grooves in a radial direction are formed so as to face in opposite directions in the eccentric rotation direction.

6. The sliding component according to claim 4, wherein the dynamic pressure generation grooves and the other dynamic pressure generation grooves are radially separated from each other with a separation width larger than a radial width of the facing sliding surface formed in an annular shape.

7. The sliding component according to claim 4, wherein a plurality of non-communication grooves surrounded by a land partitioning the dynamic pressure generation grooves and the other dynamic pressure generation grooves are provided in the circumferential direction between the dynamic pressure generation grooves and the other dynamic pressure generation grooves.

8. The sliding component according to claim 7, wherein a plurality of the non-communication grooves are radially arranged between adjacent two of the dynamic pressure generation grooves and the other dynamic pressure generation grooves in the radial direction, and
the non-communication grooves arranged in the radial direction are different in shape.

9. The sliding component according to claim 2, wherein the sliding surface and the facing sliding surface slide relative to each other with eccentric rotation such that the facing sliding surface overlaps with part of the plurality of dynamic pressure generation grooves and the facing sliding surface does not overlap with remains of the dynamic pressure generation grooves at any moment.

10. The sliding component according to claim 2, wherein the dynamic pressure generation grooves are arranged in the circumferential direction on one of an inner diameter side and an outer diameter side of the sliding surface, and
the sliding surface is further provided with a plurality of other dynamic pressure generation grooves arranged in the circumferential direction on remaining one of the inner diameter side and the outer diameter side of the sliding surface and each having, in a plan view, a tapered portion configured to become narrower toward the upstream side in the eccentric rotation direction of the facing sliding surface relatively to the sliding surface.

11. The sliding component according to claim 10, wherein adjacent two of the tapered portions of the dynamic pressure generation grooves and the other dynamic pressure generation grooves in a radial direction are formed so as to face in opposite directions in the eccentric rotation direction.

12. The sliding component according to claim 10, wherein the dynamic pressure generation grooves and the other dynamic pressure generation grooves are radially separated from each other with a separation width larger than a radial width of the facing sliding surface formed in an annular shape.

\* \* \* \* \*